US012579948B2

(12) United States Patent
Lee et al.

(10) Patent No.: US 12,579,948 B2
(45) Date of Patent: Mar. 17, 2026

(54) DATA DRIVER AND DISPLAY DEVICE INCLUDING THE SAME

(71) Applicant: Samsung Electronics Co., Ltd., Suwon-si (KR)

(72) Inventors: Hajun Lee, Suwon-si (KR); Jeongah Ahn, Suwon-si (KR); Eunjong Jang, Suwon-si (KR); Seunghwan Ji, Suwon-si (KR)

(73) Assignee: Samsung Electroncis Co., Ltd., Suwon-si (KR)

(*) Notice: Subject to any disclaimer, the term of this patent is extended or adjusted under 35 U.S.C. 154(b) by 0 days.

(21) Appl. No.: 19/062,707

(22) Filed: Feb. 25, 2025

(65) Prior Publication Data

US 2026/0031055 A1 Jan. 29, 2026

(30) Foreign Application Priority Data

Jul. 29, 2024 (KR) ........................ 10-2024-0100548

(51) Int. Cl.
*G09G 3/3291* (2016.01)
*G09G 3/00* (2006.01)

(52) U.S. Cl.
CPC ........... *G09G 3/3291* (2013.01); *G09G 3/006* (2013.01); *G09G 2300/0819* (2013.01); *G09G 2300/0852* (2013.01); *G09G 2310/066* (2013.01); *G09G 2310/08* (2013.01); *G09G 2320/046* (2013.01)

(58) Field of Classification Search
CPC ................. G09G 3/3291; G09G 3/006; G09G 2300/0819; G09G 2300/0852; G09G 2310/066; G09G 2310/08; G09G 2320/046
See application file for complete search history.

(56) References Cited

U.S. PATENT DOCUMENTS

| | | | |
|---|---|---|---|
| 9,449,560 | B2 | 9/2016 | Oh et al. |
| 9,460,661 | B2 | 10/2016 | Shim et al. |
| 9,626,027 | B2 | 4/2017 | Han et al. |
| 9,823,765 | B2 | 11/2017 | Lee et al. |
| 9,851,825 | B2 | 12/2017 | Kim et al. |
| 10,019,088 | B2 | 7/2018 | Kim et al. |

(Continued)

FOREIGN PATENT DOCUMENTS

| | | |
|---|---|---|
| KR | 10-2015-0033165 A | 4/2015 |
| KR | 10-2015-0062011 A | 6/2015 |

(Continued)

*Primary Examiner* — Amy Onyekaba
(74) *Attorney, Agent, or Firm* — Fish & Richardson P.C.

(57) ABSTRACT

A data driver configured to drive a display panel including a plurality of data lines, a plurality of sensing lines, and a plurality of subpixels includes a driving block configured to provide a data signal to each of the plurality of subpixels, a sensing block configured to measure an electrical characteristic of each of the plurality of subpixels, a plurality of data internal lines configured to connect a plurality of driving block nodes included in the driving block to a plurality of data pads connected to the plurality of data lines, and a plurality of sensing internal lines configured to connect a plurality of sensing nodes included in the sensing block to a plurality of sensing pads connected to the plurality of sensing lines, wherein each of the plurality of sensing internal lines includes a line portion between at least one data internal line and one sensing internal line.

20 Claims, 18 Drawing Sheets

(56) References Cited

U.S. PATENT DOCUMENTS

| | | | | |
|---|---|---|---|---|
| 10,311,797 | B2 * | 6/2019 | In | G09G 3/3266 |
| 10,339,872 | B2 | 7/2019 | Park | |
| 10,614,733 | B2 * | 4/2020 | Cai | H10D 86/60 |
| 11,703,982 | B2 | 7/2023 | Lee et al. | |
| 2017/0154578 | A1 * | 6/2017 | In | G09G 3/3283 |
| 2019/0088180 | A1 * | 3/2019 | Cai | G09G 3/006 |
| 2020/0335045 | A1 * | 10/2020 | Jeong | G09G 3/3233 |
| 2023/0335066 | A1 * | 10/2023 | Jeong | G09G 3/3291 |

FOREIGN PATENT DOCUMENTS

| | | | |
|---|---|---|---|
| KR | 10-2015-0125129 | A | 11/2015 |
| KR | 10-2017-0039056 | A | 4/2017 |

* cited by examiner

DATA DRIVER AND DISPLAY DEVICE INCLUDING THE SAME

CROSS-REFERENCE TO RELATED APPLICATION

This application is based on and claims priority under 35 U.S.C. § 119 to Korean Patent Application No. 10-2024-0100548, filed on Jul. 29, 2024, in the Korean Intellectual Property Office, the disclosure of which is incorporated by reference herein in its entirety.

BACKGROUND

The inventive concepts relate to a semiconductor device, and for example, to a data driver driving a display panel to display an image on the display panel and a display device including the same.

The display device includes a display panel displaying an image and a display driving circuit driving the display panel. The display driving circuit may drive the display panel by receiving image data from the outside and applying an image signal corresponding to the received image data to a data line of the display panel. Recently, the use of an organic light-emitting diode (hereinafter referred to as OLED) display panel in which each of a plurality of subpixels in a pixel array has an OLED has been increasing.

In the OLED display panel, when electrical characteristics such as threshold voltage and mobility of a driving transistor provided in a subpixel are ununiform between the subpixels and are changed due to deterioration of the subpixels, the image quality of an image displayed on the OLED display panel may deteriorate. Therefore, technologies for external compensation that detect the electrical characteristics of subpixels and compensate for subpixel data to be supplied to each of the subpixels by using compensation values determined based on the detected electrical characteristics have been researched.

SUMMARY

The inventive concepts provide a data driver and a display device capable of reducing a line capacitance deviation of sensing internal lines connected to a sensing line of a display panel and arranged on the data driver driving the display panel.

According to some example embodiments of the inventive concepts, there is provided a data driver configured to drive a display panel including a plurality of data lines, a plurality of sensing lines, and a plurality of subpixels connected to the plurality of data lines and the plurality of sensing lines, the data driver including a driving block configured to provide a data signal to each of the plurality of subpixels, a sensing block configured to measure an electrical characteristic of each of the plurality of subpixels, a plurality of data internal lines configured to connect a plurality of driving block nodes included in the driving block to a plurality of data pads connected to the plurality of data lines, and a plurality of sensing internal lines configured to connect a plurality of sensing nodes included in the sensing block to a plurality of sensing pads connected to the plurality of sensing lines, wherein each of the plurality of sensing internal lines includes a line portion between at least one data internal line and one sensing internal line.

According to some example embodiments of the inventive concepts, there is provided a data driver configured to drive a display panel including a plurality of data lines, a plurality of sensing lines, and a plurality of subpixels connected to the plurality of data lines and the plurality of sensing lines, the data driver including a driving block configured to provide a data signal to each of the plurality of subpixels, a sensing block configured to measure an electrical characteristic of each of the plurality of subpixels, a plurality of data internal lines configured to connect a plurality of driving block nodes included in the driving block to a plurality of data pads connected to the plurality of data lines, and a plurality of sensing internal lines configured to connect a plurality of sensing nodes included in the sensing block to a plurality of sensing pads connected to the plurality of sensing lines, wherein two sensing internal lines among the plurality of sensing internal lines are between the plurality of data internal lines.

According to another some example embodiments of the inventive concepts, there is provided a display device including a display panel including a plurality of data lines, a plurality of sensing lines, and a plurality of subpixels connected to the plurality of data lines and the plurality of sensing lines, and a data driver configured to drive the display panel, wherein the data driver includes a driving block configured to provide a data signal to each of the plurality of subpixels, a sensing block configured to measure an electrical characteristic of each of the plurality of subpixels, a plurality of data internal lines configured to connect a plurality of driving block nodes included in the driving block to a plurality of data pads connected to the plurality of data lines, and a plurality of sensing internal lines configured to connect a plurality of sensing nodes included in the sensing block to a plurality of sensing pads connected to the plurality of sensing lines, wherein two sensing internal lines among the plurality of sensing internal lines are between the plurality of data internal lines.

BRIEF DESCRIPTION OF THE DRAWINGS

Some example embodiments will be more clearly understood from the following detailed description taken in conjunction with the accompanying drawings in which.

DETAILED DESCRIPTION

Hereinafter, some example embodiments of the inventive concepts are described in connection with the accompanying drawings.

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same.

It will be understood that elements and/or properties thereof described herein as being "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%. Further, regardless of whether numerical values or shapes are modified as "about" or "substantially," it will be understood that these values and shapes should be construed as including a manufacturing or operational tolerance (e.g., ±10%) around the stated numerical values or shapes.

Figure 1:
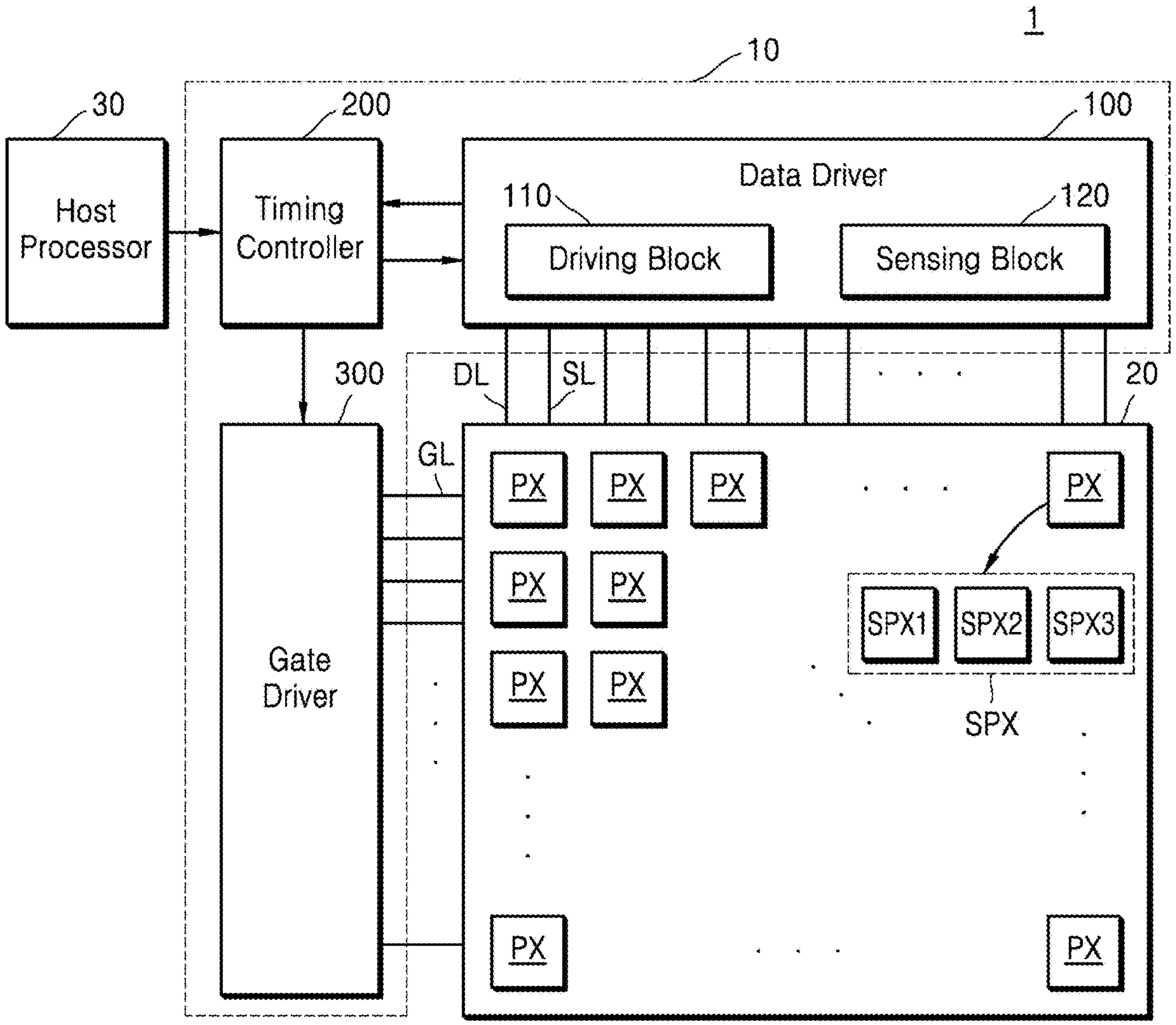
FIG. 1 is a block diagram illustrating a display system according to some example embodiments.

FIG. 1 is a block diagram illustrating a display system 1 according to some example embodiments.

The display system 1 according to some example embodiments may be mounted on an electronic device having an image display function. For example, examples of the electronic device may include a smartphone, a tablet personal computer (PC), a portable multimedia player (PMP), a camera, a wearable device, a television, a digital video disk (DVD) player, a refrigerator, an air conditioner, an air purifier, a set-top box, various medical devices, a navigation device, a global positioning system (GPS) receiver, a vehicle device, furniture, and/or various measuring devices.

Referring to FIG. 1, the display system 1 may include a display driving circuit 10, a display panel 20, and/or a host processor 30. The display driving circuit 10 may include a data driver 100, a timing controller 200, and/or a gate driver 300. The display driving circuit 10 and the display panel 20 may be implemented as a single module and may be referred to as a display device.

The host processor 30 may control the display system 1 generally. The host processor 30 may generate image data to be displayed on the display panel 20, and transmit the image data and/or a control command to the display driving circuit 10. The host processor 30 may be a graphics processor. However, the inventive concepts are not limited thereto, and the host processor 30 may be implemented as various types of processors such as a central processing unit (CPU), a microprocessor, a multimedia processor, and/or an application processor. In some example embodiments, the host processor 30 may be implemented as an integrated circuit (IC) and/or a system-on-chip (SoC).

The display panel 20 may include a plurality of signal lines, for example, a plurality of gate lines GL, a plurality of data lines DL, a plurality of sensing lines SL, and/or a plurality of pixels PX connected to the plurality of signal lines and arranged in a matrix form.

Each, or one or more, of the plurality of pixels PX may include a plurality of subpixels SPX, for example, a first subpixel SPX1, a second subpixel SPX2, and/or a third subpixel SPX3. Each, or one or more, of the plurality of subpixels SPX included in the display panel 20 may be connected to the corresponding gate line GL, data line DL, and/or sensing line SL. In some example embodiments, the subpixels SPX included in one pixel PX may be connected to the same sensing line SL.

The subpixels SPX included in one pixel PX may exhibit different colors. For example, red (R), green (G), and/or blue (B) subpixels may be included in each, or one or more, of the pixels PX. In other words, the pixel PX may have an RGB structure. However, the inventive concepts are not limited thereto, and the pixel PX may have an RGBW structure further including a white (W) subpixel for improvement of luminance. Alternatively, the pixel PX may be implemented in a combination of the subpixels SPX of different colors.

In some example embodiments, the display panel 20 may be an OLED display panel in which each, or one or more, of the subpixels SPX includes an organic light-emitting diode (OLED). In some example embodiments, the display panel 20 may be a quantum dot (QD) display panel in which each, or one or more, of the subpixels SPX includes a QD layer. However, the inventive concepts are not limited thereto, and the display panel 20 may be implemented as another type of flat panel display or flexible display panel.

The timing controller 200 may control the driving timing of the data driver 100 and the gate driver 300 based on control commands received from the host processor 30. The timing controller 200 may perform various image processing for changing the format of the image data, reducing power consumption, etc. on the image data received from the host processor 30. For example, when the display panel 20 has an RGBW structure, and the received image data has an RGB format corresponding to the RGB structure, the timing controller 200 may change the data format of the image data from the RGB format to the RGBW format by performing data format change processing. The timing controller 200 may provide the image data on which image processing is performed to the data driver 100.

The timing controller 200 may also perform data compensation, that is, external compensation, on the image data in an image processing operation and provide the compensated image data to the data driver 100. The timing controller 200 may include a data compensator (not shown). The timing controller 200 may receive a reference sensing value representing electrical characteristics of each, or one or more, of the plurality of subpixels SPXs (or subpixels in a compensation unit) included in the display panel 20 from the data driver 100, and generate compensation values for compensating for changes in the electrical characteristics due to deviation and/or degradation of the electrical characteristics of the plurality of subpixels SPXs, based on the reference sensing value. For example, the electrical characteristics may include a threshold voltage of a driving transistor in the subpixel SPX, mobility of the driving transistor, a threshold voltage of a light-emitting element, etc. The timing controller 200 may store the compensation values internally and/or externally, and perform data compensation on the image data based on the compensation values.

The gate driver 300 may drive the plurality of gate lines GLs of the display panel 20 by using a gate control signal received from the timing controller 200. The gate driver 300 may provide pulses of a gate-on voltage, for example, a scan voltage and/or a sensing-on voltage, to the corresponding gate line GL during a corresponding driving period of each, or one or more, of the plurality of gate lines GL, based on the gate control signal.

The data driver 100 may include a driving block 110 and/or a sensing block 120, and may drive the plurality of subpixels PX through the plurality of data lines DL, and measure electrical characteristics of the plurality of subpixels SPX through the plurality of sensing lines SL.

The driving block 110 may digital-analog convert the received image data and provide data signals, which are converted analog signals, to the display panel 20 through the plurality of data lines DL. The data signals may be respectively provided to the plurality of subpixels SPX.

In a display mode and/or a sensing mode, the driving block 110 may convert the image data provided from the timing controller 200 and/or internally set sensing data into data signals, for example, data voltages, and output the data voltages to the plurality of data lines DL of the display panel 20. The driving block 110 may include a plurality of digital-to-analog converters, and each of the plurality of digital-to-analog converters may convert input data (e.g., subpixel data) into a data voltage.

The plurality of data lines DL may be respectively connected to a plurality of data pads, and the plurality of data pads may be respectively connected to a plurality of data internal lines.

The sensing block 120 may measure the electrical characteristics of the plurality of subpixels SPX periodically or aperiodically. The sensing block 120 may measure the electrical characteristics of each, or one or more, of the plurality of subpixels SPX in the sensing mode, and the sensing mode may be set in a manufacturing operation of the display device, a booting period after power-on of the display system 1, an end period during power-off, and/or a dummy period (or a vertical blanking period) between frame display periods of the display panel 20.

The sensing block 120 may receive a sensing signal for example, a pixel voltage and/or a pixel current, representing the electrical characteristics of each, or one or more, of the plurality of subpixels SPX through the plurality of sensing lines SL, and generate a sensing value by analog-to-digital converting the sensing signal.

The sensing block 120 may provide an initialization voltage and/or a low potential voltage to each, or one or more, of the plurality of subpixels SPX through the plurality of sensing lines SL in the sensing mode. The plurality of sensing lines SL may be respectively connected to a plurality of sensing pads, and the plurality of sensing pads may be respectively connected to a plurality of sensing internal lines. The plurality of sensing lines SL may receive the initialization voltage and/or the low potential voltage from a voltage supply unit 121 of the sensing block 120 through the plurality of sensing internal lines.

The plurality of sensing internal lines may have line capacitances varying according to their arranged positions. For example, the plurality of sensing internal lines may have different line capacitances according to types of adjacent lines. Line capacitance deviations of the plurality of sensing internal lines may affect the quality of electrical characteristic measurements of the plurality of subpixels SPX.

In some example embodiments, each, or one or more, of the plurality of sensing internal lines may include a line arranged between at least one data internal line and one sensing internal line. In other words, the two sensing internal lines may be arranged between the plurality of data internal lines.

According to some example embodiments, the line capacitance deviations of the plurality of sensing internal lines may be reduced regardless of arranged positions of the plurality of sensing internal lines, and accordingly, the quality of electrical characteristic measurements of the plurality of subpixels SPX may be improved.

Figure 2A:
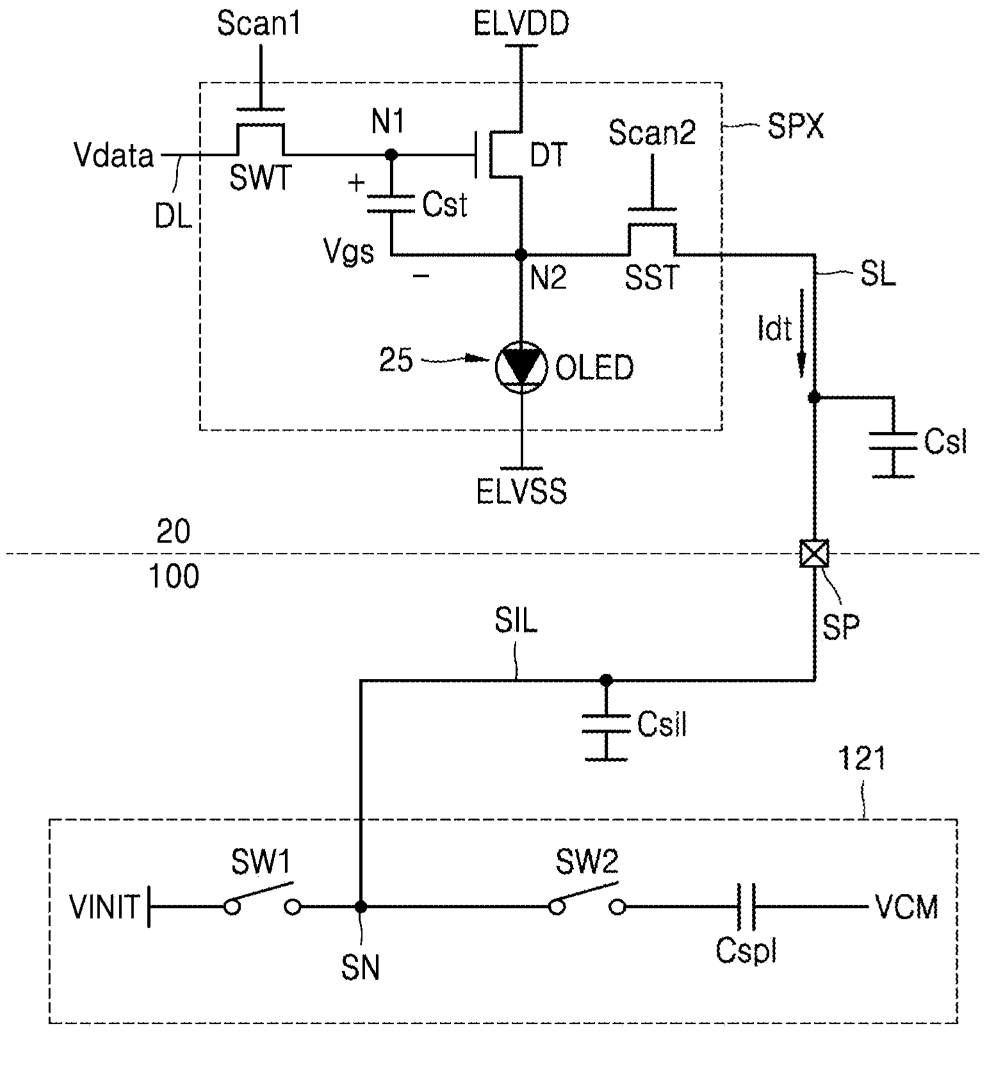
FIGS. 2A and 2B are a diagram of an equivalent circuit of a subpixel and an operation timing diagram of the equivalent circuit according to some example embodiments.
Figure 2B:
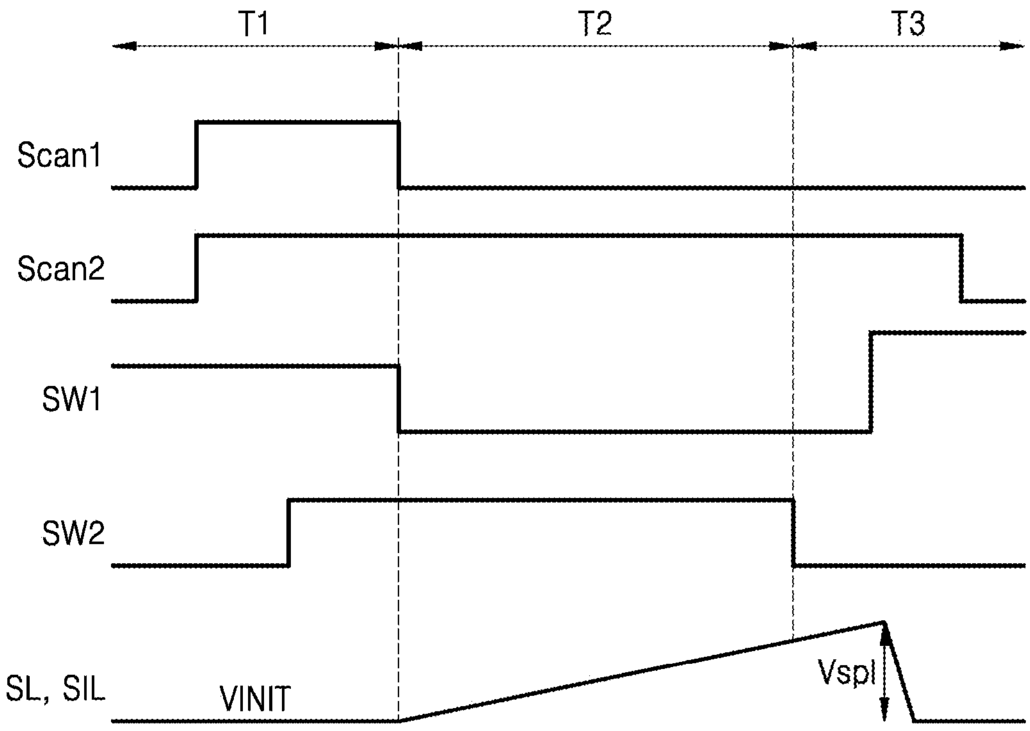

FIGS. 2A and 2B are respectively a diagram of an equivalent circuit of a subpixel and an operation timing diagram of the equivalent circuit according to some example embodiments.

Referring to FIGS. 2A and 2B, the subpixel SPX may include a switching transistor SWT, a driving transistor DT, an OLED 25, a storage capacitor Cst, and/or a sensing transistor SST. However, the configuration and structure of the subpixel SPX in FIG. 2 are only examples of a subpixel SPX circuit, and may be changed in various ways.

A first driving voltage ELVDD and/or a second driving voltage ELVSS may be applied to the subpixel SPX. The first driving voltage ELVDD may be relatively higher than the second driving voltage ELVSS.

The switching transistor SWT, the sensing transistor SST, and/or the driving transistor DT may each include an amorphous silicon (a-Si) thin film transistor (TFT), a poly-Si TFT, an oxide TFT, and/or an organic TFT.

The switching transistor SWT may be connected between the data line DL and a gate node N1 of the driving transistor DT, and may be controlled by a first scan signal Scan1.

The sensing transistor SST may be connected between a source node N2 of the driving transistor DT and the sensing line SL, and may be controlled by a second scan signal Scan2. The sensing line SL may be connected to a sensing pad SP, and a voltage provided from the voltage supply unit 121 of the sensing block 120 may be applied to the sensing pad SP.

The voltage supply unit 121 may include a first switch SW1 transmitting an initialization voltage VINIT and/or a second switch SW2 transmitting a low potential voltage VCM, and the first switch SW1 and/or the second switch SW2 may be connected to a sensing node SN. The low potential voltage VCM may be lower than the initialization voltage VINIT. For example, the low potential voltage VCM may be 0.9 V, and the initialization voltage VINT may be in a range of about 2 V to about 6 V, however, example embodiments are not limited thereto.

In a first period T1, as the first scan signal Scan1 of a turn-on level is applied, the switching transistor SWT may be turned on so that a data voltage Vdata supplied through the data line DL may be applied to the gate node N1 of the driving transistor DT.

In the first period T1, the first switch SW1 may be turned on so that the initialization voltage VINIT is applied to the sensing pad SP through a sensing internal line SIL, and the sensing transistor SST may be turned on by the second scan signal Scan2 so that the initialization voltage VINIT applied to the sensing pad SP is applied to the source node N2 of the driving transistor DT through the sensing line SL.

Accordingly, in the first period T1, a driving voltage Vgs of the driving transistor DT, which is a difference between the data voltage Vdata and the initialization voltage VINIT, may be stored in the storage capacitor Cst.

In a second period T2, as the first scan signal Scan1 of a turn-off level is applied, the switching transistor SWT may be turned off.

In the second period T2, the second switch SW2 may be turned on so that the low potential voltage VCM is applied to the sensing pad SP through the sensing internal line SIL, and a driving current Idt proportional to the driving voltage Vgs stored in the storage capacitor Cst may flow. While the driving current Idt flows, a sensing line capacitor Csl, which is a parasitic capacitor of the sensing line SL, a sensing internal line capacitor Csil, which is a parasitic capacitor of the sensing internal line SIL, and a sampling capacitor Cspl between the second switch SW2 and a supply node of the low potential voltage VCM may be charged.

Accordingly, in the second period T2, a sampling voltage Vspl stored in the sensing line capacitor Csl, the sensing internal line capacitor Csil, and the sampling capacitor Cspl may gradually increase.

In a third period T3, when the second switch SW2 is turned off, the voltage stored in the sampling capacitor Cspl may be transmitted to the timing controller 200 through an analog-to-digital converter, and the timing controller 200 may perform external compensation based on the received voltage.

That is, a capacitor storing the driving current Idt used for external compensation may include the sensing line capacitor Csl, the sensing internal line capacitor Csil, and/or the sampling capacitor Cspl, and a deviation between the sensing line capacitor Csl and the sensing internal line capacitor Csil of the plurality of sensing lines SL and the plurality of sensing internal lines SIL may affect display quality.

The storage capacitor Cst may store the difference between the data voltage Vdata applied to the gate node N1 of the driving transistor DT and the initialization voltage VINIT supplied to the source node N2 of the driving transistor DT through the sensing transistor SST, thereby supplying the constant driving voltage Vgs to the driving transistor DT during a certain period, for example, one frame.

The first driving voltage ELVDD may be applied to a drain node of the driving transistor DT, and the driving transistor DT may supply the driving current Idt proportional to the driving voltage Vgs to the OLED 25.

The OLED 25 includes an anode connected to the source node N2 of the driving transistor DT, a cathode to which the second driving voltage ELVSS is applied, and/or an organic emission layer between the cathode and the anode. The cathode may be a common electrode shared by all, or one or more, subpixels. When the driving current Idt is supplied from the driving transistor DT, the OLED 25 may generate light in the organic emission layer. The intensity of light may be proportional to the driving current Idt.

Figure 3:
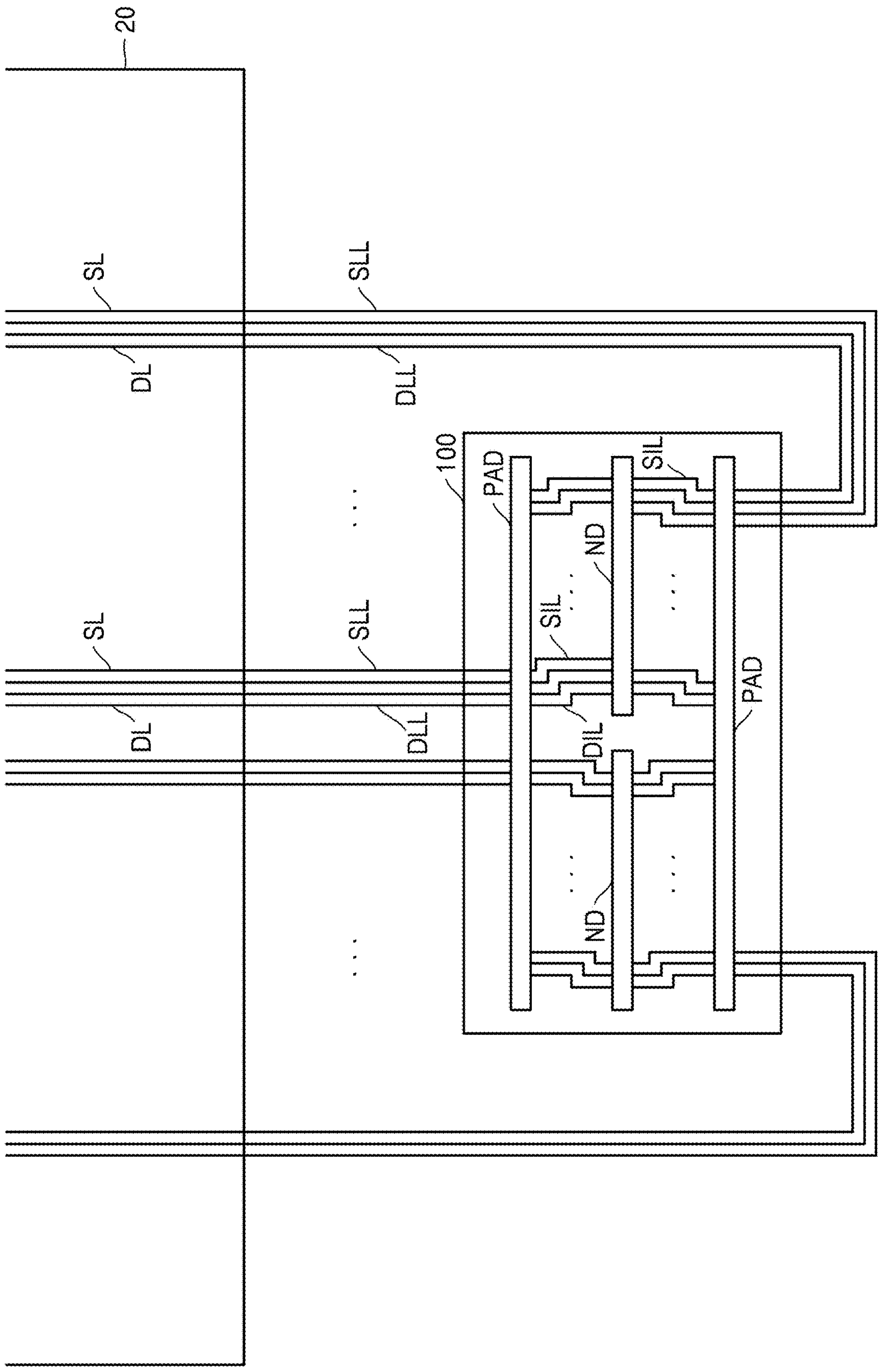
FIG. 3 illustrates an arrangement of lines in a data driver according to some example embodiments.

FIG. 3 illustrates an arrangement of lines in the data driver 100 according to some example embodiments.

Referring to FIG. 3, a plurality of data internal lines DIL and/or the plurality of sensing internal lines SIL may be arranged inside the data driver 100, and a plurality of data link lines DLL and/or a plurality of sensing link lines SLL connected to the plurality of data internal lines DIL and/or the plurality of sensing internal lines SIL may be connected to the plurality of data lines DL and the plurality of sensing lines SL arranged on the display panel 20.

The plurality of data link lines DLL and/or the plurality of sensing link lines SLL may be wirings patterned on a chip on film (COF) or a printed circuit board (PCB). The plurality of data link lines DLL and/or the plurality of sensing link lines SLL may be connected to the plurality of data internal lines DIL and/or the plurality of sensing internal lines SIL through the plurality of data pads DP and/or the plurality of sensing pads SP.

The data driver 100 may include a node unit ND and/or a pad unit PAD. A plurality of node units ND and/or a plurality of pad units PAD may be included, and the plurality of node units ND may be arranged side by side at the center of the data driver 100, and the plurality of pad units PAD may be separately arranged at the edge of the data driver 100.

A plurality of driving block nodes and/or a plurality of sensing nodes may be included in the node unit ND, and a plurality of data pads and/or a plurality of sensing pads may be included in the pad unit PAD. The driving block nodes may be inside and/or outside the driving block 110, and the sensing nodes may be inside and/or outside the sensing block 120. The plurality of driving block nodes and the plurality of sensing nodes may be arranged side by side on the same line, but example embodiments are not limited thereto.

The plurality of sensing internal lines SIL may extend from the plurality of sensing nodes to the plurality of sensing pads, and the plurality of data internal lines DIL may extend from the plurality of driving block nodes to the plurality of data pads. When the pad units PAD are arranged at the upper edge and the lower edge of the data driver 100, some of the sensing internal lines SIL and/or some of the data internal lines DIL may extend to the pad unit PAD arranged at the upper edge of the data driver 100, and the remaining sensing internal lines SIL and/or the remaining data internal lines DIL may extend to the pad unit PAD arranged at the lower edge of the data driver 100.

The plurality of sensing internal lines SIL and/or the plurality of data internal lines DIL may have different lengths and/or line widths. For example, some of the sensing internal lines SIL and some of the data internal lines DIL may be formed to be longer than and have line widths wider than those of the other sensing internal lines SIL and the other data internal lines DIL.

When the pad units PAD are arranged at the upper edge and the lower edge of the data driver 100, some of the sensing link lines SLL and/or some of the data link lines DLL may extend from the pad unit PAD arranged at the upper edge of the data driver 100 to the display panel 20, and the remaining sensing link lines SLL and/or the remaining data link lines DLL may extend from the pad unit PAD arranged at the lower edge of the data driver 100 to the display panel 20.

Although not shown, when one pad unit PAD is arranged at the upper edge of the data driver 100, the plurality of sensing internal lines SIL and/or the plurality of data internal lines DIL may extend to the pad unit PAD arranged at the upper edge of the data driver 100, and the plurality of sensing link lines SLL and/or the plurality of data link lines DLL may extend straightly from the pad unit PAD arranged at the upper edge of the data driver 100 to the display panel 20.

Some of the data pads included in the pad unit PAD may be deactivated according to the resolution. For example, in a high resolution mode, all of the plurality of data pads may be activated, and in a low resolution mode, some of the plurality of data pads may be deactivated. The high resolution mode may be referred to as a first mode and the low resolution mode may be referred to as a second mode.

In some example embodiments, each, or one or more, of the plurality of data pads may be a data output pad, and data input pads may be arranged on the pad unit PAD together with the data output pads. For example, the data input pads may be arranged at the center of the pad unit PAD arranged on a lower portion of the data driver 100, and the data output pads may be arranged in an area where the data input pads are not arranged.

Figure 4:
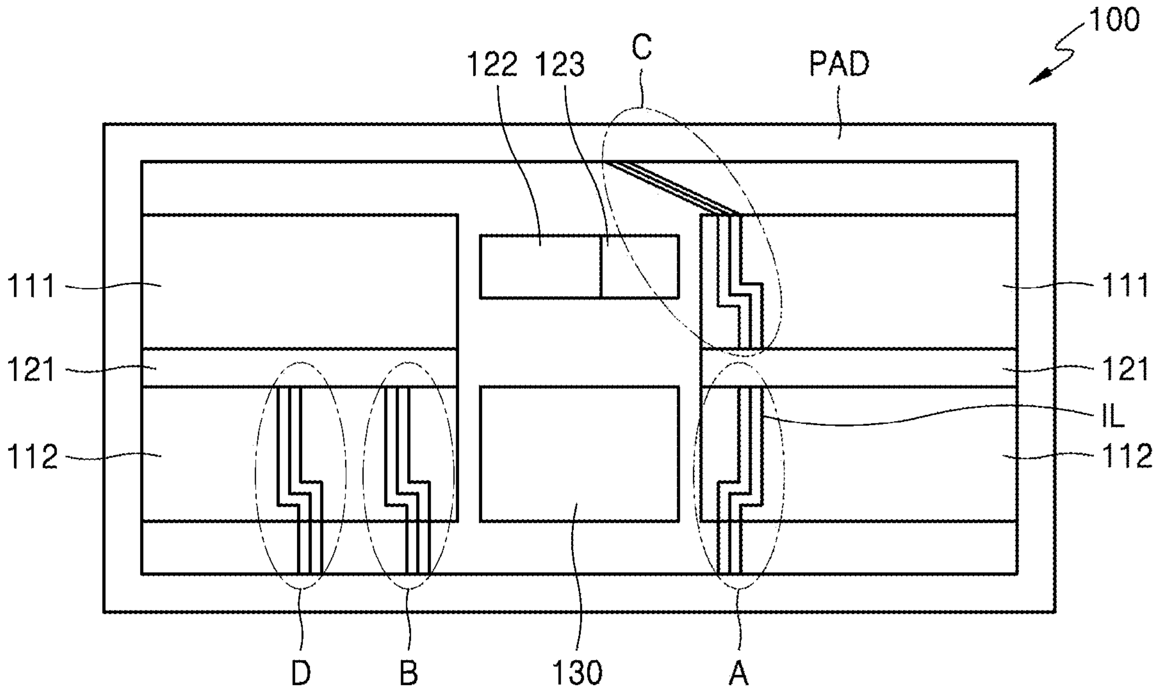
FIG. 4 illustrates a layout of a data driver according to some example embodiments.

FIG. 4 illustrates a layout of the data driver 100 according to some example embodiments.

Referring to FIG. 4, the data driver 100 may include a source-amplifier 111, a decoder and shift register 112, a voltage supply unit 121, an analog front end 122, a digital-to-analog converter 123, an input processing unit 130, etc. The source-amplifier 111 and/or the decoder and shift register 112 may be configurations of the driving block 110, and the analog front end 122 and the digital-to-analog converter 123 may be configurations of the sensing block 120. The input processing unit 130 may be configured to receive and/or process input data.

Two node units (ND in FIG. 3) and/or two voltage supply units 121 may be arranged in a horizontal direction at the center of the data driver 100, and the pad unit PAD may be arranged at an edge of the data driver 100.

A plurality of source-amplifiers 111 may be arranged above and a plurality of decoders and shift registers 112 may be arranged below, with respect to the voltage supply unit 121 of the data driver 100.

The analog front end 122 and/or the digital-to-analog converter 123 may be arranged between the plurality of source-amplifiers 111 of the data driver 100, and the input processing unit 130 may be arranged between the plurality of decoders and shift registers 112.

The plurality of internal lines IL may be arranged between the node unit ND of FIG. 3 and the pad unit PAD of the data driver 100. The plurality of internal lines IL may include a plurality of data internal lines DIL in FIG. 3 and the plurality of sensing internal lines SIL in FIG. 3.

An area A may indicate an area including a first channel, an area B may indicate an area including a last channel, an area C may indicate an area including a relatively long internal line IL, and an area D may indicate an area including an intermediate channel. Hereinafter, the arrangement of the sensing internal lines and the data internal lines of each area according to some example embodiments will be described in detail with reference to FIGS. 5 to 8, but only the node unit ND and the pad unit PAD will be described.

Figure 5A:
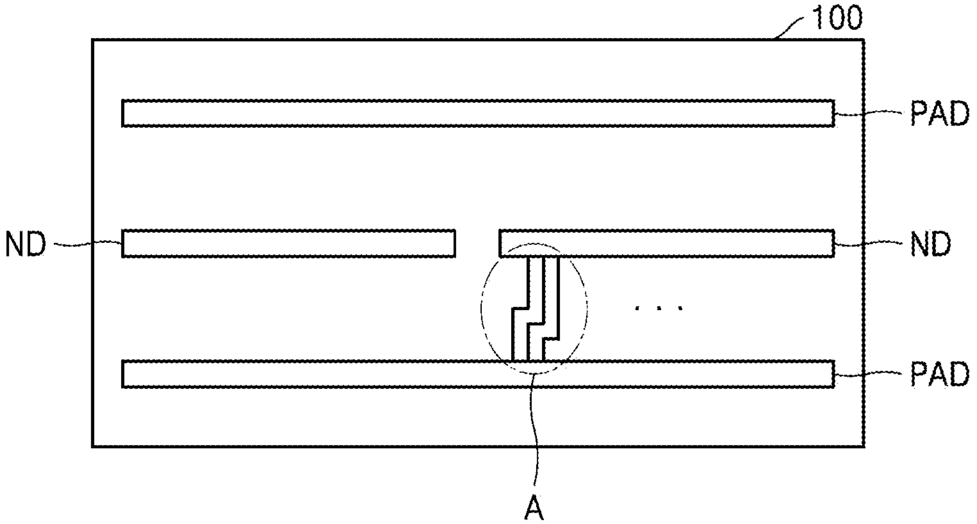
FIGS. 5A and 5B illustrate an arrangement of sensing internal lines and data internal lines in an area A according to some example embodiments.
Figure 5B:
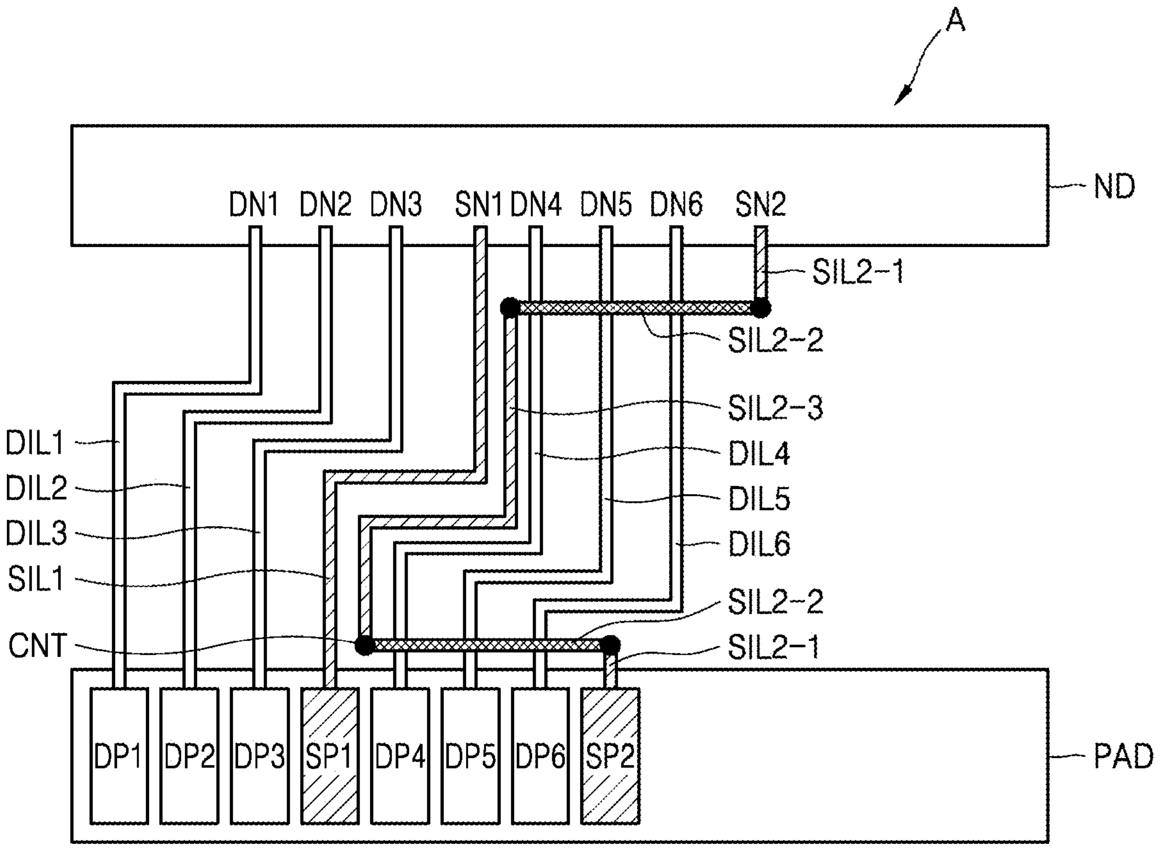

FIGS. 5A and 5B illustrate an arrangement of the sensing internal lines SIL and the data internal lines DIL in the area A according to some example embodiments.

Referring to FIGS. 5A and 5B, the line arrangement of FIG. 5B is a line arrangement of the area A of FIG. 5A, that is, an area extending from the right node unit ND located at the center of the data driver 100 to the pad unit PAD located at a lower edge of the data driver 100. That is, the line arrangement of FIG. 5B shows a first line arrangement of the right node unit ND.

The node unit ND according to some example embodiments refers to an area in which the plurality of driving block nodes DN included in the driving block 110 and the plurality of sensing nodes SN included in the sensing block 120 are arranged.

The three driving block nodes DN and the one sensing node SN may be sequentially and repeatedly arranged in the node unit ND according to some example embodiments, and the three data pads DP and the one sensing pad SP may be sequentially and repeatedly arranged in the pad unit PAD. In other words, the two or more driving block nodes DN may be arranged between the two sensing nodes SN, and the two or more data pads DP may be arranged between the two sensing pads SP. The three driving block nodes DN and the one sensing node SN may have the same arrangement order as the three data pads DP and the one sensing pad SP corresponding thereto. In a form in which the three data pads DP and the one sensing pad SP are repeatedly arranged, four channels may be referred to as one unit.

The three data pads DP may be the data pads DP which are connected to the data line DL connected to the R subpixel, the data line DL connected to the G subpixel, and/or the data line DL connected to the B subpixel.

The one sensing pad SP may be the sensing pad SP connected to the sensing line SL which is connected to the R subpixel, the G subpixel, and/or the G subpixel.

Although not shown, four driving block nodes DN and one sensing node SN may be sequentially and repeatedly arranged in the node unit ND according to some example embodiments, and four data pads DP and one sensing pad SP may be sequentially and repeatedly arranged in the pad unit PAD. The four driving block nodes DN and the one sensing node SN may have the same arrangement order as the four data pads DP and the one sensing pad SP corresponding thereto. In a form in which the four data pads DP and the one sensing pad SP are repeatedly arranged, five channels may be referred to as one unit.

The four data pads DP may be the data pads DP which are connected to the data line DL connected to the R subpixel, the data line DL connected to the G subpixel, the data line DL connected to the B subpixel, and/or the data line DL connected to a W subpixel.

The one sensing pad SP may be the sensing pad SP connected to the sensing line SL which is connected to the R subpixel, the G subpixel, the G subpixel, and/or the W subpixel.

For example, in the area A, first to third driving block nodes DN1 to DN3, a first sensing node SN1, fourth to sixth driving block nodes DN4 to DN6, and/or a second sensing node SN2 may be sequentially arranged in the node unit ND, and first to third data pads DP1 to DP3, a first sensing pad SP1, fourth to sixth data pads DP4 to DP6, and/or a second sensing pad SP2 may be sequentially arranged on the pad unit PD.

Each, or one or more, of the plurality of sensing internal lines SIL according to some example embodiments includes a line portion arranged between at least one data internal line DIL and the one sensing internal line SIL. In a certain area, the three driving block nodes DN and the one sensing node SN may have different arrangement orders from the three data internal lines DIL and the one sensing internal line SIL corresponding thereto. The data internal lines DIL and the sensing internal lines SIL may have the same line width.

For example, in the area A, in a region between the node unit ND and the pad unit PAD, first to third data internal lines DIL1 to DIL3, a first sensing internal line SIL1, fourth to sixth data internal lines DIL4 to DIL6, and/or a 2-1 sensing internal line portion SIL2-1 of a second sensing internal line SIL2 may be sequentially arranged, and the first to third data internal lines DIL1 to DIL3, the first sensing internal line SIL1, a 2-3 sensing internal line portion SIL2-3 of the second sensing internal line SIL2, and/or the fourth to sixth data internal lines DIL4 to DIL6 may be sequentially arranged. The 2-1 sensing internal line portion SIL2-1 may indicate a portion connected to the second sensing node SN2 and a portion connected to the second sensing pad SP2, and the 2-3 sensing internal line portion SIL2-3 may indicate a portion adjacent to the first sensing internal line SILL.

That is, the second sensing internal line SIL2 may include a 2-1 sensing internal line portion SIL2-1 and a 2-3 sensing internal line portion SIL2-3 which are separated from the fourth to sixth data internal lines DIL4 to DIL6 adjacent to the second sensing internal line SIL2.

According to some example embodiments, a first distance between the third data internal line DIL3 and the first sensing internal line SIL1, a second distance between the first sensing internal line SIL1 and the 2-3 sensing internal line portion SIL2-3 of the second sensing internal line SIL2, and/or a third distance between the 2-3 sensing internal line portion SIL2-3 of the second sensing internal line SIL2 and the fourth data internal line DIL4 may be the same, but are not limited thereto.

The 2-1 sensing internal line portion SIL2-1 and the 2-3 sensing internal line portion SIL2-3 may be connected to each other by the 2-2 sensing internal line portion SIL2-2 of the second sensing internal line SIL2. The number of 2-1 sensing internal line portions SIL2-1 may be the same as the number of 2-2 sensing internal line portions SIL2-2. The 2-2 sensing internal line portions SIL2-2 may be disposed in different layers to overlap the fourth to sixth data internal lines DIL4 to DIL6 adjacent to the second sensing internal line SIL2.

For example, the 2-1 sensing internal line portions SIL2-1 and the 2-3 sensing internal line portions SIL2-3 may be disposed in the same layer as the fourth to sixth data internal lines DIL4 to DIL6, and the 2-2 sensing internal line portions SIL2-2 may be disposed in different layers from the fourth to sixth data internal lines DIL4 to DIL6. The 2-2 sensing internal line portion SIL2-2, the 2-1 sensing internal line portion SIL2-1, and/or the 2-3 sensing internal line portion SIL2-3 may be electrically connected to each other through a contact CNT.

That is, the second sensing internal line SIL2 may include the 2-2 sensing internal line portion SIL2-2 crossing the fourth to sixth data internal lines DIL4 to DIL6 adjacent to the second sensing internal line SIL2.

The first sensing internal line SIL1 adjacent to the 2-3 sensing internal line portion SIL2-3 of the second sensing internal line SIL2 may be arranged separately from the first to third data internal lines DIL1 to DIL3 adjacent to the first sensing internal line SIL1 and the second sensing internal line SIL2.

The length of the 2-3 sensing internal line portion SIL2-3 according to some example embodiments may be longer than the sum of lengths of the two 2-1 sensing internal line portions SIL2-1.

According to some example embodiments, the first sensing internal line SIL1 may be arranged between the first to third data internal lines DIL1 to DIL3 and the 2-3 sensing internal line portion SIL2-3 of the second sensing internal line SIL2, and the 2-3 sensing internal line portion SIL2-3 of the second sensing internal line SIL2 may be arranged between the first sensing internal line SIL1 and the fourth to sixth data internal lines DIL4 to DIL6.

That is, the first sensing internal line SIL1 and the 2-3 sensing internal line portion SIL2-3 of the second sensing internal line SIL2 are arranged between the sensing internal line SIL, which is a line to which signals of the same phase are applied, and the data internal line DIL, which is a line to which signals of different phases are applied, and as a result, the magnitudes of coupling capacitance due to adjacent lines of the first sensing internal line SIL1 and the second sensing internal line SIL2 are similar, and thus, the line capacitances of the first sensing internal line SIL1 and the second sensing internal line SIL2 may be reduced compared to when the first sensing internal line SIL1 and the second sensing internal line SIL2 are arranged between the data internal lines DIL.

As a result, the quality of electrical characteristic measurements of the plurality of subpixels SPX may be improved while maintaining the arrangement order of the driving block node DN and the sensing nodes SN and the arrangement order of the data pads DP and the sensing pads SP.

Hereinafter, FIGS. 6A, 6B, 7A, 7B, 8A, 8B, 9A, and 9B will be described in detail with respect to the configurations different from those of FIGS. 5A and 5B, and the same configurations as those of FIGS. 5A and 5B will be omitted or briefly described.

Figure 6A:
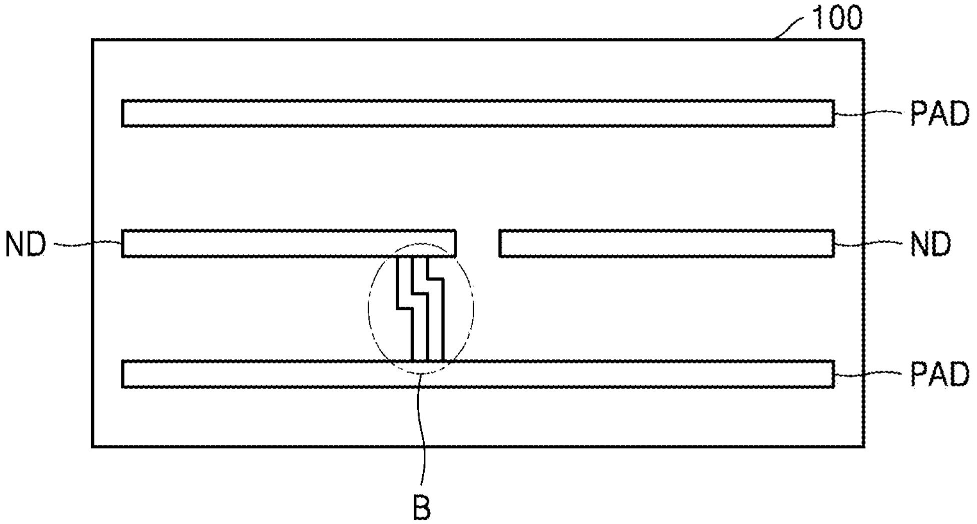
FIGS. 6A and 6B illustrate an arrangement of sensing internal lines and data internal lines in an area B according to some example embodiments.
Figure 6B:
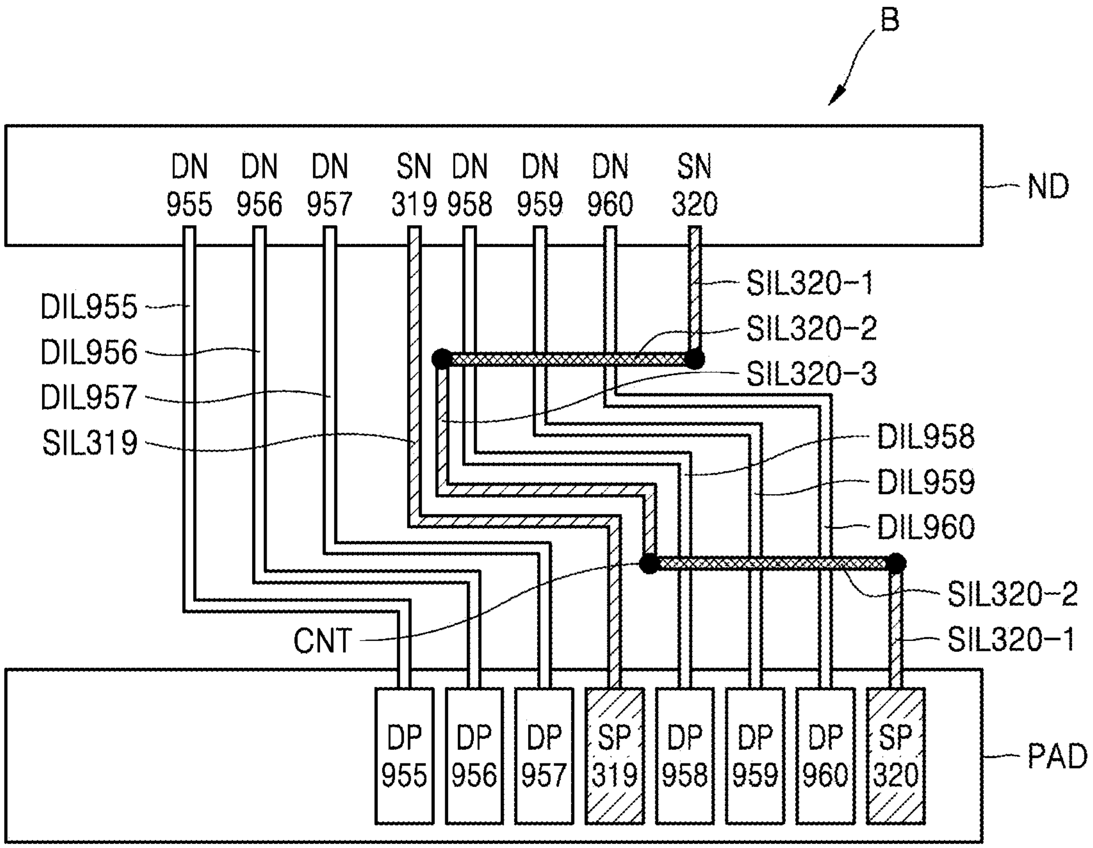

FIGS. 6A and 6B illustrate an arrangement of the sensing internal lines SIL and the data internal lines DIL in the area B according to some example embodiments.

Referring to FIGS. 6A and 6B, the line arrangement of FIG. 6B is a line arrangement of the area B of FIG. 6A, that is, an area extending from the left node unit ND located at the center of the data driver 100 to the pad unit PAD located at a lower edge of the data driver 100. That is, the line arrangement of FIG. 6B shows a last line arrangement of the left node unit ND.

For example, in the area B, 955th to 957th driving block nodes DN955 to DN957, a 319th sensing node SN319, 958th to 960th driving block nodes DN958 to DN960, and/or a 320th sensing node SN320 may be sequentially arranged in the node unit ND, and 955th to 957th data pads DP955 to DP957, a 319th sensing pad SP319, 958th to 960 data pads DP958 to DP960, and/or a 320th sensing pad SP320 may be sequentially arranged on the pad unit PD. The 320th sensing node SN320 may correspond to the last node of the left node unit ND, and the data node DN and/or the sensing node SN may be no longer arranged on the right side of the 320th sensing node SN320. The 320th sensing pad SP320 may correspond to the last pad corresponding to the left node unit ND, and the data pad DP and/or the sensing pad SP may be no longer arranged on the right side of the 320th sensing pad SP320.

In the area B, in a region between the node unit ND and the pad unit PAD, the 955th to 957th data internal lines DIL955 to DIL957, the 319th sensing internal line SIL319, the 958 to 960th data internal lines DIL958 to DIL960, and/or a 320-1 sensing internal line portion SIL320-1 of the 320th sensing internal line SIL320 may be sequentially arranged, and the 955th to 957th data internal lines DIL955 to DIL957, a 319th sensing internal line portion SIL319, a 320-3 sensing internal line portion SIL320-3 of a 320th sensing internal line SIL320, and/or 958th to 960th data internal lines DIL958 to DIL960 may be sequentially arranged. The 320-1 sensing internal line portion SIL320-1 may indicate a portion connected to the 320th sensing node SN320 and a portion connected to the 320th sensing pad SP320, and the 320-3 sensing internal line portion SIL320-3 may indicate a portion adjacent to the 319th sensing internal line SIL319. The 320th sensing internal line SIL320 may correspond to the last line corresponding to the left node unit ND, and the data internal line DIL and the sensing internal line SIL may be no longer arranged on the right side of the 320th sensing internal line SIL320.

According to some example embodiments, the 319th sensing internal line SIL319 may be arranged between the 955th to 957th data internal lines DIL955 to DIL957 and the 320-3 sensing internal line portion SIL320-3 of the 320th sensing internal line SIL320 and the 320-3 sensing internal line portion SIL320-3 of the 320th sensing internal line SIL320 may be arranged between the 319th sensing internal line SIL319 and the 958th to 960th data internal lines DIL958 to DIL960.

That is, the 319th sensing internal line SIL319 and the 320-3 sensing internal line portion SIL320-3 of the 320th sensing internal line SIL320 may be arranged between the sensing internal line SIL, which is a line to which signals of the same phase are applied, and the data internal line DIL, which is a line to which signals of different phases are applied, and as a result, the magnitudes of coupling capacitance due to adjacent lines of the 319th sensing internal line SIL319 and the 320th sensing internal line SIL320 are similar, and the deviation of line capacitances of the 319th sensing internal line SIL319 and the 320th sensing internal line SIL320 may be reduced compared to when the 319th sensing internal line SIL319 is arranged between the data internal lines DIL and the data internal line DIL is arranged only on one side of the 320th sensing internal line SIL320.

Figure 7A:
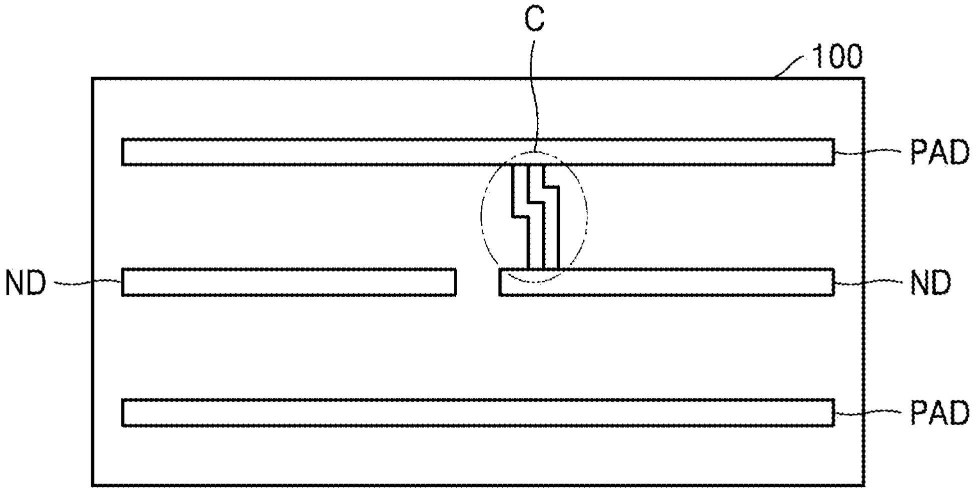
FIGS. 7A and 7B illustrate an arrangement of sensing internal lines and data internal lines in an area C according to some example embodiments.
Figure 7B:
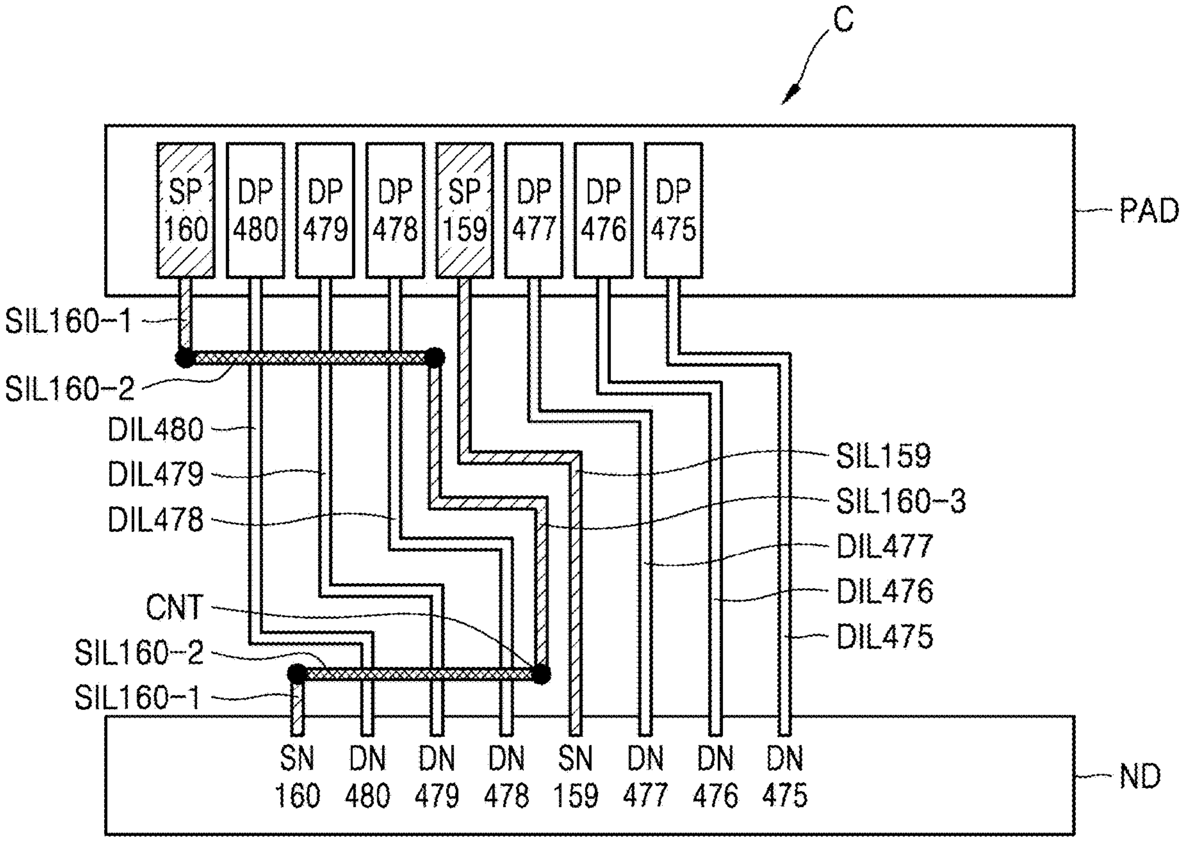

FIGS. 7A and 7B illustrate an arrangement of the sensing internal lines SIL and the data internal lines DIL in the area C according to some example embodiments.

Referring to FIGS. 7A and 7B, the line arrangement of FIG. 7B illustrates a line arrangement of the area C of FIG. 7A, that is, an area extending from the right node unit ND located at the center of the data driver 100 to the center of the pad unit PAD located at an upper edge of the data driver 100.

For example, in the area C, a 160th sensing node SN160, 480th to 478th driving block nodes DN480 to DN478, a 159th sensing node SN159, and/or 477th to 475th driving block nodes DN477 to DN475 may be sequentially arranged in the node unit ND, and a 160th sensing pad SP160, 480th to 478th data pads DP480 to DP478, a 159th sensing pad SP159, and/or 477th to 475th data pads DP477 to DP475 may be sequentially arranged on the pad unit PD.

In the area C, in a region between the node unit ND and the pad unit PAD, a 160-1 sensing internal line portion SIL160-1 of a 160th sensing internal line SIL160, 480th to 478th data internal lines DIL480 to DIL478, a 159th sensing internal line SIL159, and/or 477th to 475th data internal lines DIL477 to DIL475 may be sequentially arranged, and the 480th to 478th data internal lines DIL480 to DIL478, a 160-3 sensing internal line portion SIL160-3 of the 160th sensing internal line SIL160, the 159th sensing internal line SIL159, and/or the 477th to 475th data internal lines DIL477 to DIL475 may be sequentially arranged. The 160-1 sensing internal line portion SIL160-1 may indicate a portion connected to the 160th sensing node SN160 and a portion connected to the 160th sensing pad SP160, and the 160-3 sensing internal line portion SIL160-3 may indicate a portion adjacent to the 159th sensing internal line SIL159.

According to some example embodiments, the 160-3 sensing internal line portion SIL160-3 of the 160th sensing internal line SIL160 may be arranged between the 480th to 478th data internal lines DIL480 to DIL478 and the 159th sensing internal line SIL159, and the 159th sensing internal line SIL159 may be arranged between the 160-3 sensing internal line portion SIL160-3 of the 160th sensing internal line SIL160 and the 477th to 475th data internal lines DIL477 to DIL475.

The sensing line SL arranged in the area C may be formed to be longer than the sensing line SL arranged in another area, and may have a line width wider than that of the sensing line SL arranged in another area to reduce resistance, and thus, the line capacitance of the sensing line SL arranged in the area C may be greater than that of the sensing line SL arranged in another area.

According to some example embodiments, both the 159th sensing internal line SIL159 and the 160-3 sensing internal line portion SIL160-3 of the 160th sensing internal line SIL160 may be arranged between the sensing internal line SIL, which is a line to which signals of the same phase are applied, and the data internal line DIL, which is a line to which signals of different phases are applied. As a result, the magnitudes of coupling capacitance due to adjacent lines of the 159th sensing internal line SIL159 and the 160th sensing internal line SIL160 are reduced, and the deviation of line capacitances of the other sensing internal lines SIL may be reduced.

Figure 8A:
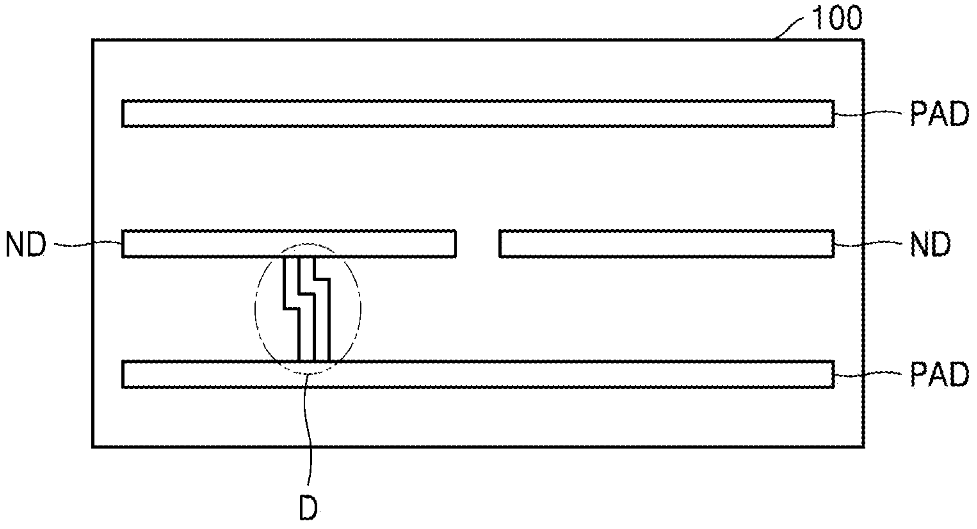
FIGS. 8A and 8B illustrate an arrangement of sensing internal lines and data internal lines in an area D according to some example embodiments.
Figure 8B:
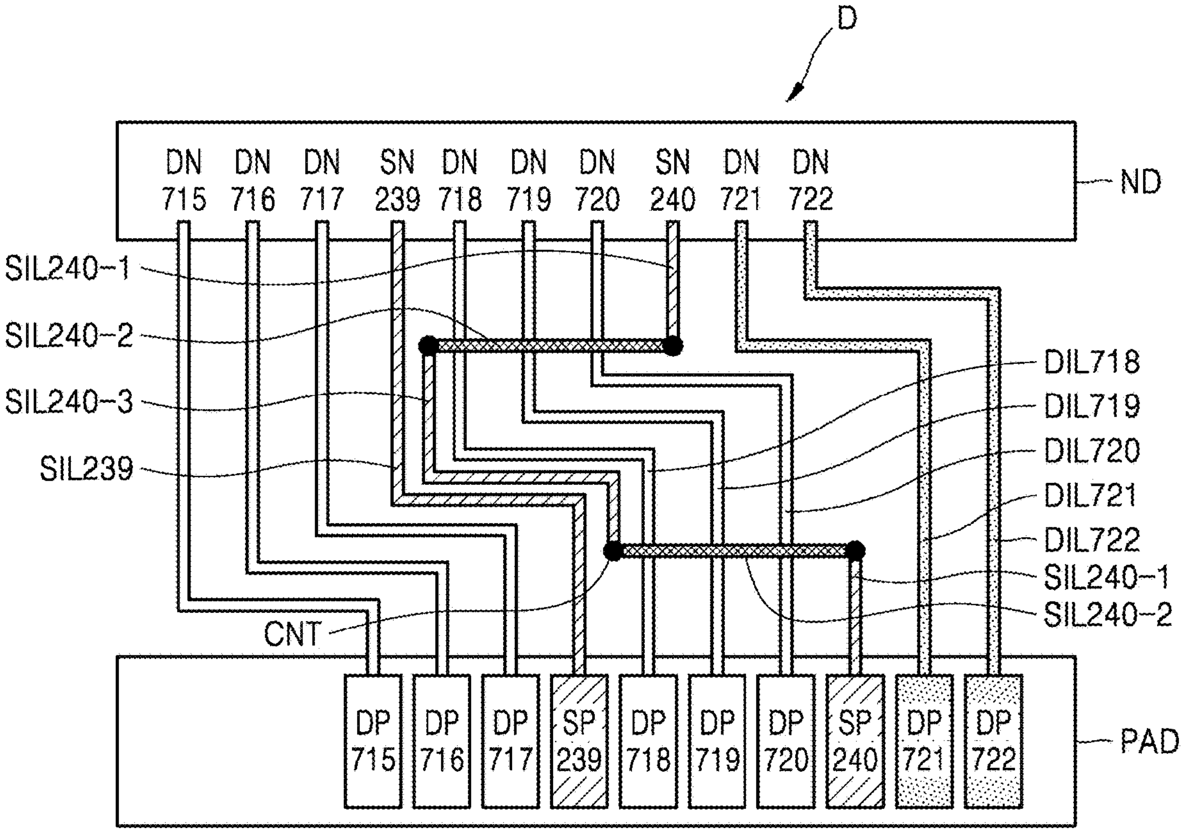

FIGS. 8A and 8B illustrate an arrangement of the sensing internal lines SIL and the data internal lines DIL in the area D according to some example embodiments.

Referring to FIGS. 8A and 8B, the line arrangement of FIG. 8B illustrates a line arrangement of the area D of FIG. 8A, that is, an area extending from the left node unit ND located at the center of the data driver 100 to the pad unit PAD located at a lower edge of the data driver 100.

For example, in the area D, 715th to 717th driving block nodes DN715 to DN717, a 239th sensing node SN239, 718th to 720th driving block nodes DN718 to DN720, a 240th sensing node SN240, and/or 721st to 722nd driving block nodes DN721 to DN722 may be sequentially arranged in the pad unit PD, and 715th to 717th data pads DP715 to DP717, a 239th sensing pad SP239, 718th to 720th data pads DP718 to DP720, a 240th sensing pad SP240, and/or 721st to 722nd data pads DP721 to DP722 may be sequentially arranged on the pad unit PD.

In the area D, in a region between the node unit ND and the pad unit PAD, 715th to 717th data internal lines DIL715 to DIL717, a 239th sensing internal line SIL239, 718th to 720th data internal lines DIL718 to DIL720, a 240-1 sensing internal line portion SIL240-1 of a 240th sensing internal line SIL240, and/or 721st to 722nd data internal lines DIL721 to DIL722 may be sequentially arranged, and 715th to 717th data internal lines DIL715 to DIL717, the 239th sensing internal line SIL239, a 240-3 sensing internal line portion SIL240-3 of the 240th sensing internal line SIL240, and/or 718th to 722nd data internal lines DIL718 to DIL722 may be sequentially arranged. The 240-1 sensing internal line portion SIL240-1 may indicate a portion connected to the 240th sensing node SN240 and a portion connected to the 240th sensing pad SP240, and the 240-3 sensing internal line portion SIL240-3 may indicate a portion adjacent to the 239th sensing internal line SIL239.

According to some example embodiments, the 239th sensing internal line SIL239 may be arranged between the 715th to 717th data internal lines DIL715 to DIL717 and the 240-3 sensing internal line portion SIL240-3 of the 240th sensing internal line SIL240, and the 240-3 sensing internal line portion SIL240-3 of the 240th sensing internal line SIL240 may be arranged between the 239th sensing internal line SIL239 and the 718th to 722nd data internal lines DIL718 to DIL722.

Here, for example, the 721st to 722nd data pads DP721 to DP722 may be deactivated in a low resolution mode according to some example embodiments. Accordingly, a data signal may be floated without being applied to the 721st to 722nd data internal lines DIL721 to DIL722.

Therefore, in terms of signal application, the 240th sensing internal line SIL240 may correspond to the last line corresponding to the right node unit ND, and the 240-3 sensing internal line portion SIL240-3 of the 240th sensing internal line SIL240 may be arranged between the 239th sensing internal line SIL239 and the 718th to 720th data internal lines DIL718 to DIL720.

According to some example embodiments, the 240-3 sensing internal line portion SIL240-3 of the 240th sensing internal line SIL240 may be adjacent to the 239th sensing internal line SIL239, and thus, regardless of whether a data signal is applied to the data internal line DIL adjacent to the sensing internal line SIL, the deviation of line capacitances of the 239th sensing internal line SIL239 and the 240th sensing internal line SIL240 may be reduced, e.g., constantly reduced.

Figure 9A:
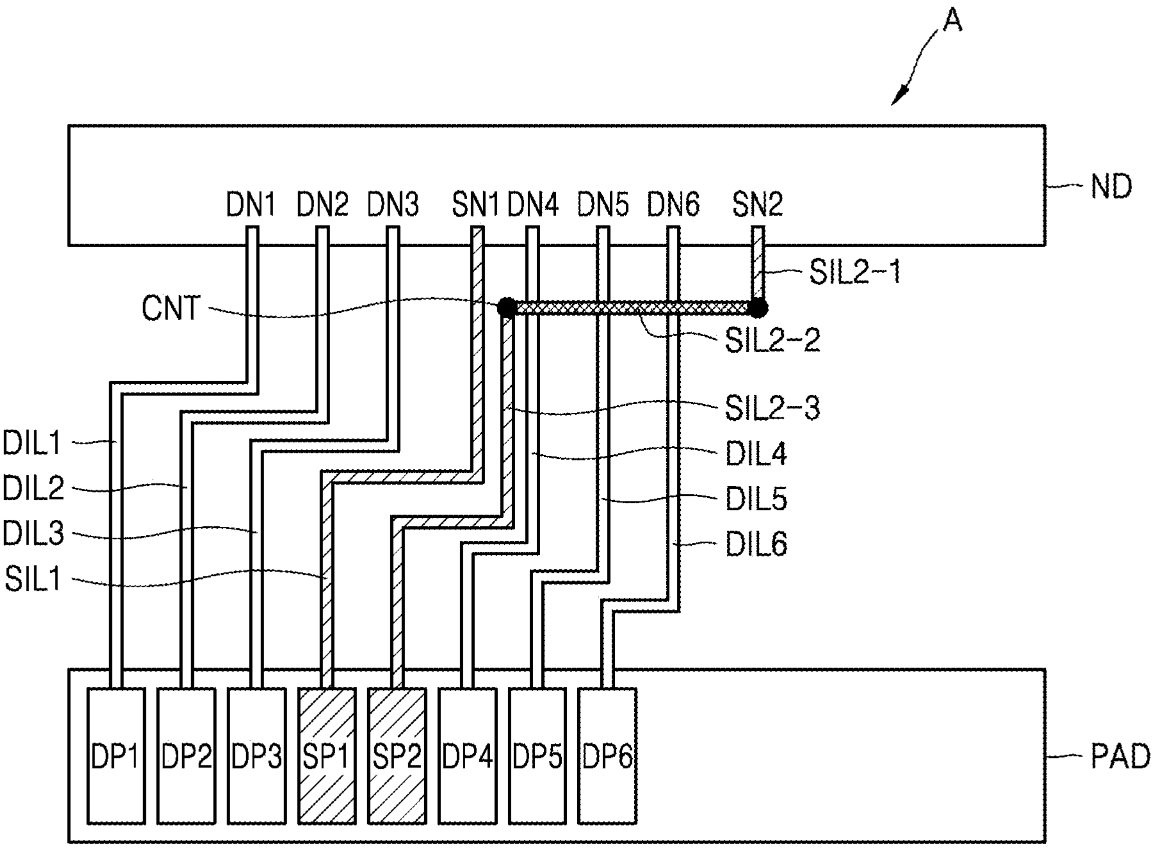
FIGS. 9A and 9B illustrate an arrangement of sensing internal lines and data internal lines in the area A according to some example embodiments.
Figure 9B:
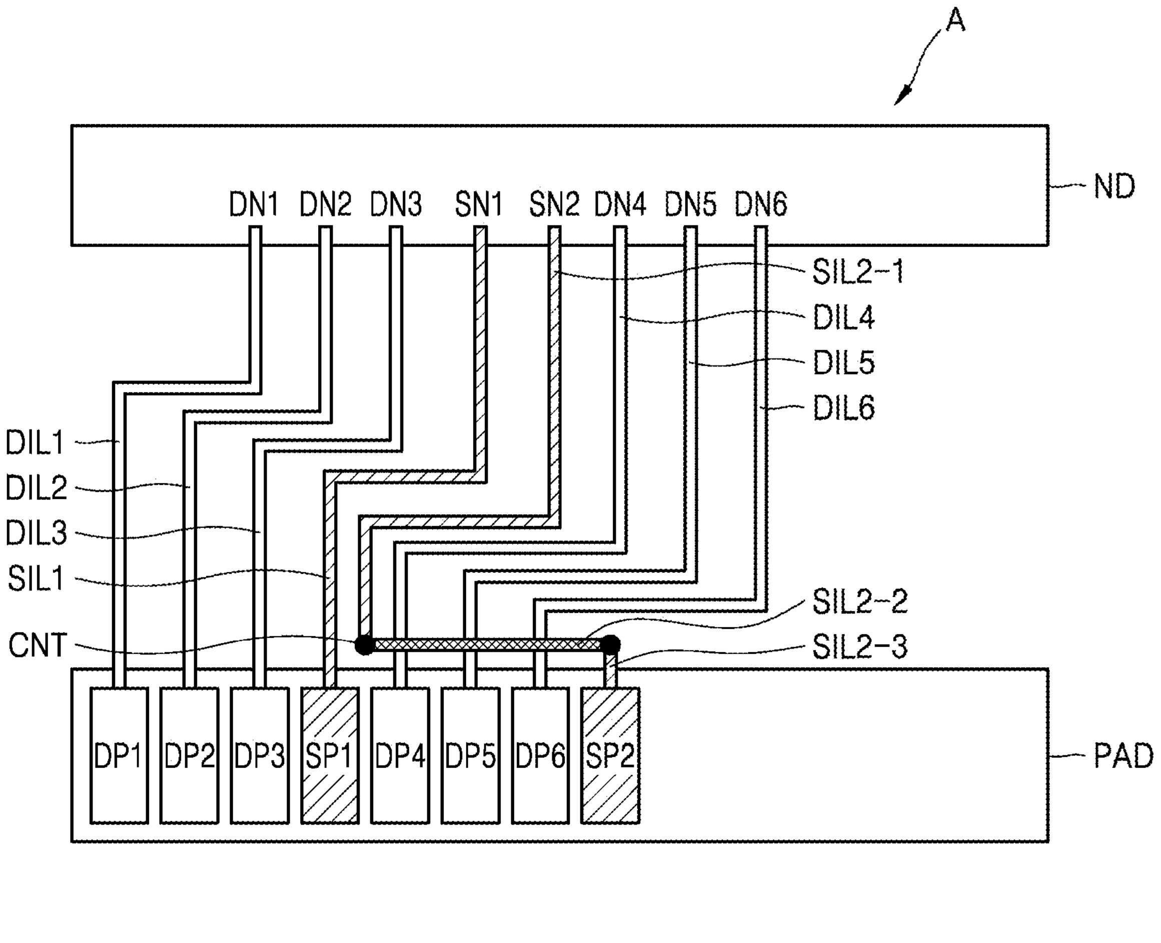

FIGS. 9A and 9B illustrate an arrangement of the sensing internal lines SIL and the data internal lines DIL in the area A according to some example embodiments.

The line arrangement of FIGS. 9A and 9B illustrates a line arrangement of the area A of FIG. 5A, that is, an area extending from the right node unit ND located at the center of the data driver 100 to the pad unit PAD located at a lower edge of the data driver 100.

The arrangement order of the plurality of driving block nodes DN and the plurality of sensing nodes SN in the area A according to some example embodiments may be different from the arrangement order of the plurality of data pads DP and the plurality of sensing pads SP corresponding to the plurality of driving block nodes DN and the plurality of sensing nodes SN, which may be applied to the areas A to D of FIGS. 9A and 9B as well as FIGS. 5A and 5B, FIGS. 6A and 6B, FIGS. 7A and 7B, and FIGS. 8A and 8B, but example embodiments are not limited thereto.

Referring to FIG. 9A, for example, the plurality of driving block nodes DN may be arranged between the first sensing node SN1 and the second sensing node SN2, and the first sensing pad SP1 and the second sensing pad SP2 respectively corresponding to the first sensing node SN1 and the second sensing node SN2 may be adjacent to each other.

For example, in the area A, the first to third driving block nodes DN1 to DN3, the first sensing node SN1, the fourth to sixth driving block nodes DN4 to DN6, and/or the second sensing node SN2 may be sequentially arranged in the pad unit PD, and the first to third data pads DP1 to DP3, the first sensing pad SP1, the second sensing pad SP2, and/or the fourth to sixth data pads DP4 to DP6 may be sequentially arranged on the pad unit PD.

For example, in the area A in a region between the node unit ND and the pad unit PAD, the first to third data internal lines DIL1 to DIL3, the first sensing internal line SIL1, the fourth to sixth data internal lines DIL4 to DIL6, and/or the 2-1 sensing internal line portion SIL2-1 of the second sensing internal line SIL2 may be sequentially arranged, and the first to third data internal lines DIL1 to DIL3, the first sensing internal line SIL1, the 2-3 sensing internal line portion SIL2-3 of the second sensing internal line SIL2, and/or the fourth to sixth data internal lines DIL4 to DIL6 may be sequentially arranged. The 2-1 sensing internal line portion SIL2-1 may indicate a portion connected to the second sensing node SN2, and the 2-3 sensing internal line portion SIL2-3 may indicate a portion connected to the second sensing pad SP2 and adjacent to the first sensing internal line SILL.

That is, the second sensing internal line SIL2 may include the 2-1 sensing internal line portion SIL2-1 and/or the 2-3 sensing internal line portion SIL2-3 which are separated from the adjacent fourth to sixth data internal lines DIL4 to DIL6.

The 2-1 sensing internal line portion SIL2-1 and the 2-3 sensing internal line portion SIL2-3 may be connected to each other by the 2-2 sensing internal line portion SIL2-2 of the second sensing internal line SIL2. When there is only one 2-1 sensing internal line portion SIL2-1, there may be only one 2-2 sensing internal line portion SIL2-2. The 2-2 sensing internal line portion SIL2-2 may overlap the fourth to sixth data internal lines DIL4 to DIL6.

That is, the second sensing internal line SIL2 may include the 2-2 sensing internal line portion SIL2-2 crossing the adjacent fourth to sixth data internal lines DIL4 to DIL6.

The first sensing internal line SIL1 may be arranged separately from the adjacent first to third data internal lines DIL1 to DIL3 and the second sensing internal line SIL2.

The length of the 2-3 sensing internal line portion SIL2-3 according to some example embodiments may be longer than the length of the 2-1 sensing internal line portion SIL2-1.

According to some example embodiments, the first sensing internal line SIL1 may be arranged between the first to third data internal lines DIL1 to DIL3 and the 2-3 sensing internal line portion SIL2-3 of the second sensing internal line SIL2, and/or the 2-3 sensing internal line portion SIL2-3 of the second sensing internal line SIL2 may be arranged between the first sensing internal line SIL1 and the fourth to sixth data internal lines DIL4 to DIL6.

That is, both the first sensing internal line SIL1 and the 2-3 sensing internal line portion SIL2-3 of the second sensing internal line SIL2 may be arranged between the sensing internal line SIL, which is a line to which signals of the same phase are applied, and the data internal line DIL, which is a line to which signals of different phases are applied, and as a result, the magnitudes of coupling capacitance due to adjacent lines of the first sensing internal line SIL1 and the second sensing internal line SIL2 are similar, and/or the deviation of line capacitances of the first sensing internal line SIL1 and the second sensing internal line SIL2 may be reduced compared to when the first sensing internal line SIL1 and the second sensing internal line SIL2 are arranged between the data internal lines DIL.

Referring to FIG. 9B, for example, the first sensing node SN1 and the second sensing node SN2 may be adjacent to each other, and the plurality of driving pads DP may be arranged between the first sensing pad SP1 and the second sensing pad SP2 corresponding to the first sensing node SN1 and the second sensing node SN2.

For example, in the area A, the first to third driving block nodes DN1 to DN3, the first sensing node SN1, the second sensing node SN2, and/or the fourth to sixth driving block nodes DN4 to DN6 may be sequentially arranged in the node unit ND, and the first to third data pads DP1 to DP3, the first sensing pad SP1, the fourth to sixth data pads DP4 to DP6, and/or the second sensing pad SP2 may be sequentially arranged on the pad unit PD.

For example, in the area A, in a region between the node unit ND and the pad unit PAD, the first to third data internal lines DIL1 to DIL3, the first sensing internal line SIL1, the 2-1 sensing internal line portion SIL2-1 of the second sensing internal line SIL2, and/or the fourth to sixth data internal lines DIL4 to DIL6 may be sequentially arranged, and the first to third data internal lines DIL1 to DIL3, the first sensing internal line SIL1, the fourth to sixth data internal lines DIL4 to DIL6, and/or the 2-3 sensing internal line portion SIL2-3 of the second sensing internal line SIL2 may be sequentially arranged. The 2-1 sensing internal line portion SIL2-1 may indicate a portion connected to the second sensing node SN2 and adjacent to the first sensing internal line SIL1, and the 2-3 sensing internal line portion SIL2-3 may indicate a portion connected to the second sensing pad SP2.

That is, the second sensing internal line SIL2 may include the 2-1 sensing internal line portion SIL2-1 and the 2-3 sensing internal line portion SIL2-3 which are separated from the adjacent fourth to sixth data internal lines DIL4 to DIL6.

The 2-1 sensing internal line portion SIL2-1 and the 2-3 sensing internal line portion SIL2-3 may be connected to each other by the 2-2 sensing internal line portion SIL2-2 of the second sensing internal line SIL2. When there is only one 2-1 sensing internal line portion SIL2-1, there may be only one 2-2 sensing internal line portion SIL2-2. The 2-2 sensing internal line portion SIL2-2 may overlap the fourth to sixth data internal lines DIL4 to DIL6.

That is, the second sensing internal line SIL2 may include the 2-2 sensing internal line portion SIL2-2 crossing the adjacent fourth to sixth data internal lines DIL4 to DIL6.

The first sensing internal line SIL1 may be arranged separately from the adjacent first to third data internal lines DIL1 to DIL3 and the second sensing internal line SIL2.

The length of the 2-1 sensing internal line portion SIL2-1 according to some example embodiments may be longer than the length of the 2-3 sensing internal line portion SIL2-3.

According to some example embodiments, the first sensing internal line SIL1 may be arranged between the first to third data internal lines DIL1 to DIL3 and the 2-3 sensing internal line portion SIL2-3 of the second sensing internal line SIL2, and the 2-1 sensing internal line portion SIL2-1 of the second sensing internal line SIL2 may be arranged between the first sensing internal line SIL1 and the fourth to sixth data internal lines DIL4 to DIL6.

That is, both the first sensing internal line SIL1 and the 2-1 sensing internal line portion SIL2-1 of the second sensing internal line SIL2 may be arranged between the sensing internal line SIL, which is a line to which signals of the same phase are applied, and the data internal line DIL, which is a line to which signals of different phases are applied, and as a result, the magnitudes of coupling capacitances due to adjacent lines of the first sensing internal line SIL1 and the second sensing internal line SIL2 are similar, and the deviation of line capacitances of the first sensing internal line SIL1 and the second sensing internal line SIL2 may be reduced compared to when the first sensing internal line SIL1 and the second sensing internal line SIL2 are arranged between the data internal lines DIL. According to some example embodiments, even when the arrangement order of the driving block nodes DN and the sensing nodes SN is partially different from the arrangement order of the data pads DP and the sensing pads SP, the quality of electrical characteristic measurements of the plurality of subpixels SPX may be improved.

Figure 10:
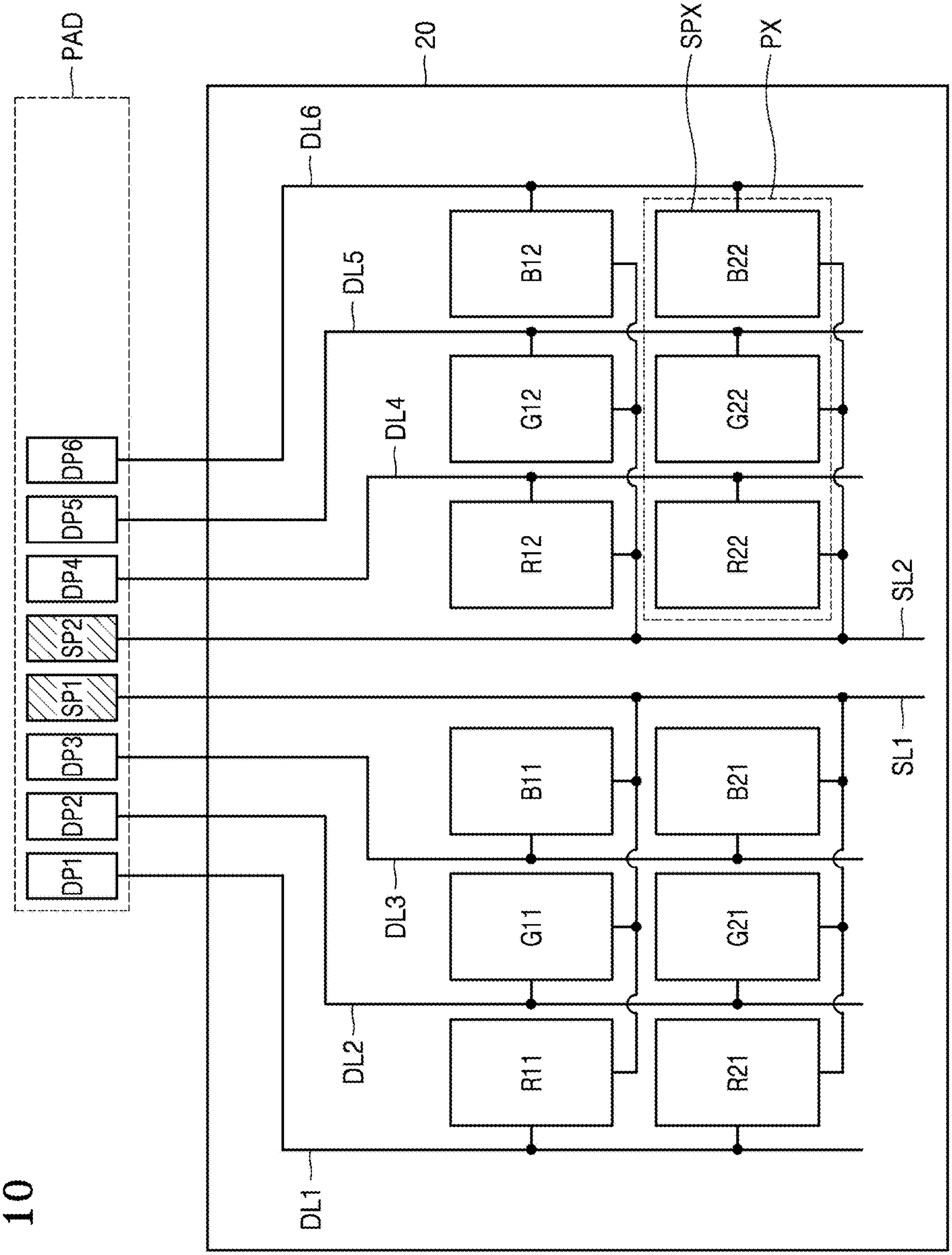
FIG. 10 illustrates an arrangement of lines on a display panel according to some example embodiments.

FIG. 10 illustrates an arrangement of lines on the display panel 20 according to some example embodiments.

FIG. 10 may be applied when the arrangement order of the data pads DP and the sensing pads SP of the pad unit PAD is the same as that of FIG. 9A.

Referring to FIG. 10, the plurality of data lines DL and the plurality of sensing lines SP connected to the plurality of data pads DP and the plurality of sensing pads SP of the pad unit PAD of the data driver 100 may extend between the subpixels SPX of the display panel 20.

According to some example embodiments, first to sixth data lines DL1 to DL6 may extend to one side of first to sixth subpixel columns, and first and second sensing lines SL1 and SL2 may extend adjacent to each other between the first pixel column and the second pixel column.

The first pixel column may include eleventh R, G, and B subpixels R11, G11, and B11, and the second pixel column may include twelfth R, G, and B subpixels R12, G12, and B12.

According to some example embodiments, the two sensing lines SL are adjacent to each other and extend to the display panel 20, and thus, the deviation of line capacitances of the sensing lines SL may be reduced compared to when the sensing line SL extends adjacent to the data line DL.

Figure 11:
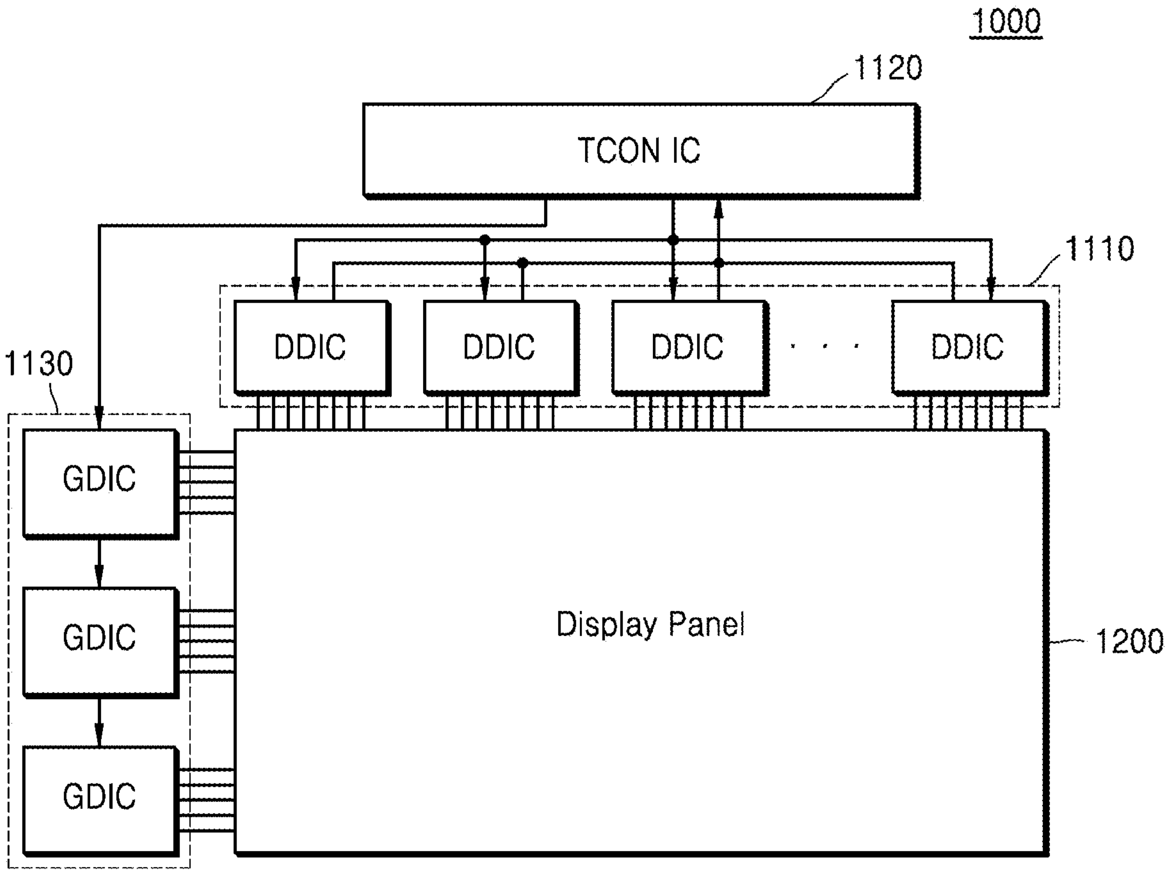
FIG. 11 illustrates an implementation example of a display device according to an embodiment.

FIG. 11 illustrates an implementation example of a display device 1000 according to some example embodiments. The display device 1000 of FIG. 11 is a device including a medium and/or large-sized display panel 1200, and may be applied to, for example, a television, a monitor, etc.

Referring to FIG. 11, the display device 1000 may include a data driver 1110, a timing controller 1120, a gate driver 1130, and/or the display panel 1200.

The timing controller TCON IC 1120 may be configured as one or more ICs or modules. The timing controller TCON IC 1120 may communicate with a plurality of data driving ICs DDIC and a plurality of gate driving ICs GDIC through a set interface.

The timing controller TCON IC 1120 may generate control signals for controlling the driving timing of the plurality of data driving ICs DDIC and/or the plurality of gate driving ICs GDIC, and may provide the control signals to the plurality of data driving ICs DDIC and/or the plurality of gate driving ICs GDIC.

The timing controller TCON IC 1120 may divide image data received from the outside and respectively provide the plurality of pieces of divided image data to the plurality of data driving ICs DDIC. In addition, the timing controller TCON IC 1120 may detect the electrical characteristics of subpixels based on reference sensing values received from the data driver 1110 and determine a compensation value for data compensation. The timing controller TCON IC 1120 may perform data compensation on the received image data.

The data driver 1110 may include the plurality of data driving ICs DDIC, and the plurality of data driving ICs DDIC may be mounted on a circuit film such as a tape carrier package (TCP), a COF, and/or a flexible print circuit (FPC), attached to the display panel 1200 in a tape automatic bonding (TAB) method, and/or mounted on a non-display area of the display panel 1200 in a chip on glass (COG) method.

According to some example embodiments, each, or one or more, of the plurality of sensing internal lines SIL included in the data driver 1110 includes a line portion arranged between the at least one data internal line DIL and the one sensing internal line SIL, and thus, the deviation of line capacitances of the plurality of sensing internal lines SIL may be reduced regardless of line arrangement positions and resolutions, and as a result, the quality of electrical characteristic measurements of the plurality of subpixels SPX may be improved.

The gate driver 1130 may include the plurality of gate driving ICs GDIC, and the plurality of gate driving ICs GDIC may be mounted on a circuit film and attached to the display panel 1200 in the TAB method, and/or mounted on the non-display area of the display panel 1200 in the COG method. Alternatively, the gate driver 1130 may be directly formed on a lower substrate of the display panel 1200 through a gate-driver in panel (GIP) method. The gate driver 1130 may be formed in the non-display area of the display panel 1200 outside a pixel array in which subpixels are formed, and may be formed by the same TFT process as the subpixels.

Figure 12:
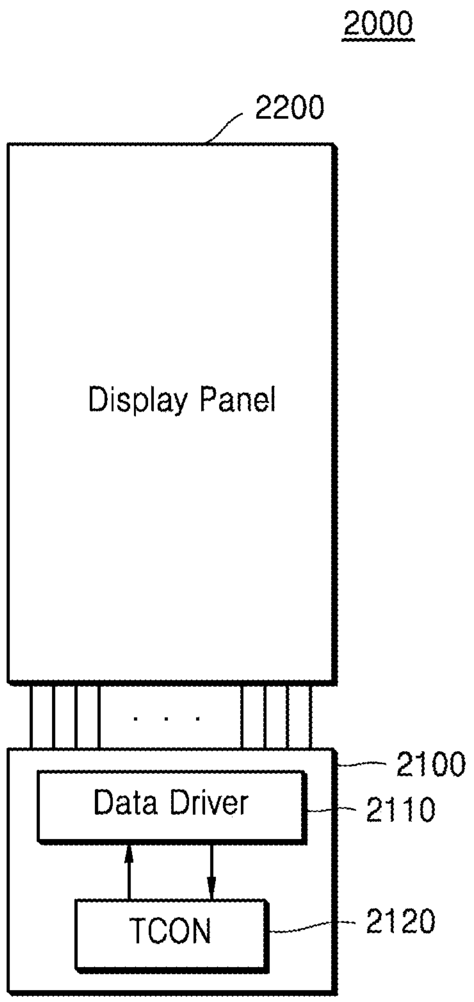
FIG. 12 illustrates an implementation example of a display device according to an embodiment.

FIG. 12 illustrates an implementation example of a display device 2000 according to some example embodiments. The display device 2000 of FIG. 12 is a device including a small-sized display panel 2200, and may be applied to, for example, a mobile device such as a smartphone and/or a tablet PC.

Referring to FIG. 12, the display device 2000 may include a display driving circuit 2100 and/or the display panel 2200. The display driving circuit 2100 may include one or more ICs, mounted on a circuit film such as a TCP, a COF, and/or a FPC, attached to the display panel 2200 in a TAB method, and/or mounted on a non-display area of the display panel 2200 in a COG method.

The display driving circuit 2100 may include a data driver 2110 and/or a timing controller 2120, and may further include a gate driver. In some example embodiments, the gate driver may be mounted on the display panel 2200.

The data driver 100 described with reference to FIG. 1 may be applied as the data driver 2110. The data driver 2110 may measure the electrical characteristics of subpixels of the display panel 2200 in a sensing mode, and provide the measured electrical characteristics of the subpixels to the timing controller 2120. The timing controller 2120 may compensate for image data based on the detected electrical characteristics of the subpixels. The timing controller 2120 may provide the compensated image data to the data driver 2110, and the data driver 2110 may drive the display panel 2200 based on the compensated image data.

As the display panel 2200 of the display device 2000 is miniaturized, the line capacitance of the sensing line SL decreases, and the line capacitance of the sensing internal line SIL may relatively have a greater impact on the quality of electrical characteristic measurements of a plurality of subpixels SPX. According to some example embodiments, each, or one or more, of the plurality of sensing internal lines SIL included in the data driver 2110 includes a line portion arranged between the at least one data internal line DIL and the one sensing internal line SIL, and thus, the deviation of line capacitances of the plurality of sensing internal lines SIL may be reduced regardless of line arrangement positions and resolutions, and as a result, the quality of electrical characteristic measurements of the plurality of subpixels may be improved.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been shown and described with reference some example embodiments thereof, it will be understood that various changes in form and details may be made therein without departing from the spirit and scope of the following claims.

What is claimed is:

1. A data driver configured to drive a display panel comprising a plurality of data lines, a plurality of sensing lines, and a plurality of subpixels connected to the plurality of data lines and the plurality of sensing lines, the data driver comprising:

a driving block configured to provide a data signal to each of the plurality of subpixels;

a sensing block configured to measure an electrical characteristic of each of the plurality of subpixels;

a plurality of data internal lines configured to connect a plurality of driving block nodes included in the driving block to a plurality of data pads connected to the plurality of data lines; and a plurality of sensing internal lines configured to connect a plurality of sensing nodes included in the sensing block to a plurality of sensing pads connected to the plurality of sensing lines, wherein each of the plurality of sensing internal lines comprises a line portion between at least one data internal line and one sensing internal line.

2. The data driver of claim 1, wherein a first sensing internal line among the plurality of sensing internal lines includes a first line portion separated from at least one data internal line adjacent to the first sensing internal line and a second line portion crossing the at least one data internal line adjacent to the first sensing internal line.

3. The data driver of claim 2, wherein the at least one data internal line adjacent to the first sensing internal line and the second line portion are on different layers.

4. The data driver of claim 3, wherein the at least one data internal line adjacent to the first sensing internal line and the first line portion are disposed on the same layer, and the first line portion and the second line portion are electrically connected to each other through a contact.

5. The data driver of claim 2, wherein a second sensing internal line adjacent to the first sensing internal line among the plurality of sensing internal lines is arranged separately from at least one data internal line adjacent to the second sensing internal line.

6. The data driver of claim 5, wherein the first sensing internal line and the second sensing internal line are spaced apart.

7. The data driver of claim 2, wherein a number of the second line portions is one or more.

8. The data driver of claim 2, wherein a number of the second line portions is two or more.

9. The data driver of claim 2, wherein two or more driving block nodes are arranged between a first sensing node connected to the first sensing internal line and a second sensing node connected to a second sensing internal line adjacent to the first sensing internal line among the plurality of sensing internal lines, and two or more data pads are between a first sensing pad connected to the first sensing internal line and a second sensing pad connected to the second sensing internal line.

10. The data driver of claim 9, wherein at least three driving block nodes are between the first sensing node and the second sensing node, at least three data pads are between the first sensing pad and the second sensing pad, and the at least three data pads are connected to a data line connected to a red subpixel, a data line connected to a green subpixel, and a data line connected to a blue subpixel, respectively.

11. The data driver of claim 2, wherein an order of the plurality of driving block nodes and the plurality of sensing nodes is the same as an order of the plurality of data pads and the plurality of sensing pads respectively corresponding to the plurality of driving block nodes and the plurality of sensing nodes, and is different from an order of the plurality of data internal lines and the plurality of sensing internal lines respectively corresponding to the plurality of driving block nodes and the plurality of sensing nodes.

12. The data driver of claim 2, wherein two or more driving block nodes are between a first sensing node connected to the first sensing internal line and a second sensing node connected to a second sensing internal line adjacent to the first sensing internal line among the plurality of sensing internal lines, and a first sensing pad connected to the first sensing internal line and a second sensing pad connected to the second sensing internal line are adjacent to each other.

13. The data driver of claim 2, wherein an order of the plurality of driving block nodes and the plurality of sensing nodes is different from an order of the plurality of data pads and the plurality of sensing pads respectively corresponding to the plurality of driving block nodes and the plurality of sensing nodes.

14. The data driver of claim 1, wherein each of the plurality of sensing nodes is connected to a first switch configured to transfer an initialization voltage and a second switch configured to transfer a low potential voltage.

15. The data driver of claim 1, wherein a line width of each of the plurality of data internal lines is the same as a line width of each of the plurality of sensing internal lines.

16. The data driver of claim 1, wherein two sensing lines among the plurality of sensing lines are adjacent to a region between two subpixel columns of the display panel.

17. The data driver of claim 1, wherein at least one data pad among the plurality of data pads is activated in a first mode and deactivated in a second mode, and the first mode and the second mode have different resolutions.

18. A data driver configured to drive a display panel comprising a plurality of data lines, a plurality of sensing lines, and a plurality of subpixels connected to the plurality of data lines and the plurality of sensing lines, the data driver comprising:

a driving block configured to provide a data signal to each of the plurality of subpixels;

a sensing block configured to measure an electrical characteristic of each of the plurality of subpixels;

a plurality of data internal lines configured to connect a plurality of driving block nodes included in the driving block to a plurality of data pads connected to the plurality of data lines; and a plurality of sensing internal lines configured to connect a plurality of sensing nodes included in the sensing block to a plurality of sensing pads connected to the plurality of sensing lines, wherein two sensing internal lines among the plurality of sensing internal lines are between the plurality of data internal lines.

19. The data driver of claim 18, wherein a distance between the two sensing internal lines is the same as a distance between each of the two sensing internal lines and a data internal line adjacent to the two sensing internal lines.

20. A display device comprising a display panel comprising a plurality of data lines, a plurality of sensing lines, and a plurality of subpixels connected to the plurality of data lines and the plurality of sensing lines, and a data driver configured to drive the display panel, wherein the data driver comprises a driving block configured to provide a data signal to each of the plurality of subpixels;

a sensing block configured to measure an electrical characteristic of each of the plurality of subpixels;

a plurality of data internal lines configured to connect a plurality of driving block nodes included in the driving block to a plurality of data pads connected to the plurality of data lines; and a plurality of sensing internal lines configured to connect a plurality of sensing nodes included in the sensing block to a plurality of sensing pads connected to the plurality of sensing lines, wherein two sensing internal lines among the plurality of sensing internal lines are between the plurality of data internal lines.

* * * * *